(12) United States Patent
Stecewycz

(10) Patent No.: US 12,407,119 B2
(45) Date of Patent: Sep. 2, 2025

(54) AUTOMOTIVE BATTERY WITH INTEGRAL ELECTRICAL CONTACT SLOTS

(71) Applicant: Joseph Stecewycz, Groton, MA (US)

(72) Inventor: Joseph Stecewycz, Groton, MA (US)

(73) Assignee: Cytherean Mandelbrot, LLC, Groton, MA (US)

( * ) Notice: Subject to any disclaimer, the term of this patent is extended or adjusted under 35 U.S.C. 154(b) by 751 days.

(21) Appl. No.: 17/734,107

(22) Filed: May 1, 2022

(65) Prior Publication Data

US 2022/0263257 A1    Aug. 18, 2022

Related U.S. Application Data

(60) Provisional application No. 63/194,135, filed on May 27, 2021.

(51) Int. Cl.
| | |
|---|---|
| *H02J 7/00* | (2006.01) |
| *H01M 10/44* | (2006.01) |
| *H01M 50/503* | (2021.01) |
| *H01M 50/543* | (2021.01) |
| *H01R 11/28* | (2006.01) |
| *H02J 7/14* | (2006.01) |
| *H02J 7/34* | (2006.01) |

(52) U.S. Cl.
CPC .......... *H01R 11/289* (2013.01); *H01M 10/44* (2013.01); *H01M 50/503* (2021.01); *H01M 50/543* (2021.01); *H01R 11/288* (2013.01); *H02J 7/342* (2020.01); *H01M 2220/20* (2013.01)

(58) Field of Classification Search
CPC ... H01R 11/287; H01R 11/289; H01R 11/288; H01R 11/00; H01R 11/18; H02J 7/342; H01M 50/543; H01M 50/503; H01M 50/531; H01M 10/44; H01M 10/06; H01M 10/12; H01M 10/10; H01M 2220/20

USPC .................................................. 320/103, 132

See application file for complete search history.

(56) References Cited

U.S. PATENT DOCUMENTS

| | | | | |
|---|---|---|---|---|
| 3,466,453 A | * | 9/1969 | Greenberg | B60D 1/62 320/DIG. 15 |
| 3,625,774 A | * | 12/1971 | Rodgers | H01R 11/287 439/500 |
| 4,224,383 A | * | 9/1980 | Taylor | H01M 50/289 429/7 |
| 4,424,264 A | * | 1/1984 | McGuire | H01M 50/147 429/179 |
| 4,637,965 A | * | 1/1987 | Davis | H01R 11/287 429/178 |
| 4,807,895 A | * | 2/1989 | Thomas | H02G 3/00 180/68.5 |
| 4,885,524 A | * | 12/1989 | Wilburn | H01M 50/55 320/DIG. 15 |

(Continued)

*Primary Examiner* — Alexis B Pacheco
(74) *Attorney, Agent, or Firm* — Joseph Stecéwycz

(57) ABSTRACT

An automotive battery includes a positive contact slot in a battery housing, the slot opening into a positive slot encasement inside the battery for insertion of a positive electrical prong for electrical connection to a contact region on a positive battery post; and, a negative contact slot in the battery housing, the slot opening into a negative slot encasement inside the battery for insertion of a negative electrical prong for electrical connection to a contact region on a negative battery post.

20 Claims, 27 Drawing Sheets

(56) References Cited

U.S. PATENT DOCUMENTS

| | | | | |
|---|---|---|---|---|
| 5,146,149 | A * | 9/1992 | Nilssen | H01M 10/46 |
| | | | | 320/112 |
| 5,236,792 | A * | 8/1993 | Larkin | H01M 50/278 |
| | | | | 429/121 |
| 5,804,770 | A * | 9/1998 | Tanaka | H01M 50/591 |
| | | | | 174/138 F |
| 5,921,809 | A * | 7/1999 | Fink | H01R 11/289 |
| | | | | 439/679 |
| 6,147,471 | A * | 11/2000 | Hunter | H01R 11/287 |
| | | | | 320/105 |
| 6,343,949 | B1 * | 2/2002 | Floyd | H01R 13/642 |
| | | | | 439/284 |
| 9,368,912 | B1 * | 6/2016 | Sullivan | H01R 11/288 |
| 2001/0012581 | A1 | 8/2001 | Zhang | |
| 2019/0199017 | A1 * | 6/2019 | Stecewycz | H02J 7/0034 |

\* cited by examiner

Section A-A

Section B-B

Section C-C

Section D-D

Section E-E

Section F-F

Section A-A

Section C-C

Section D-D

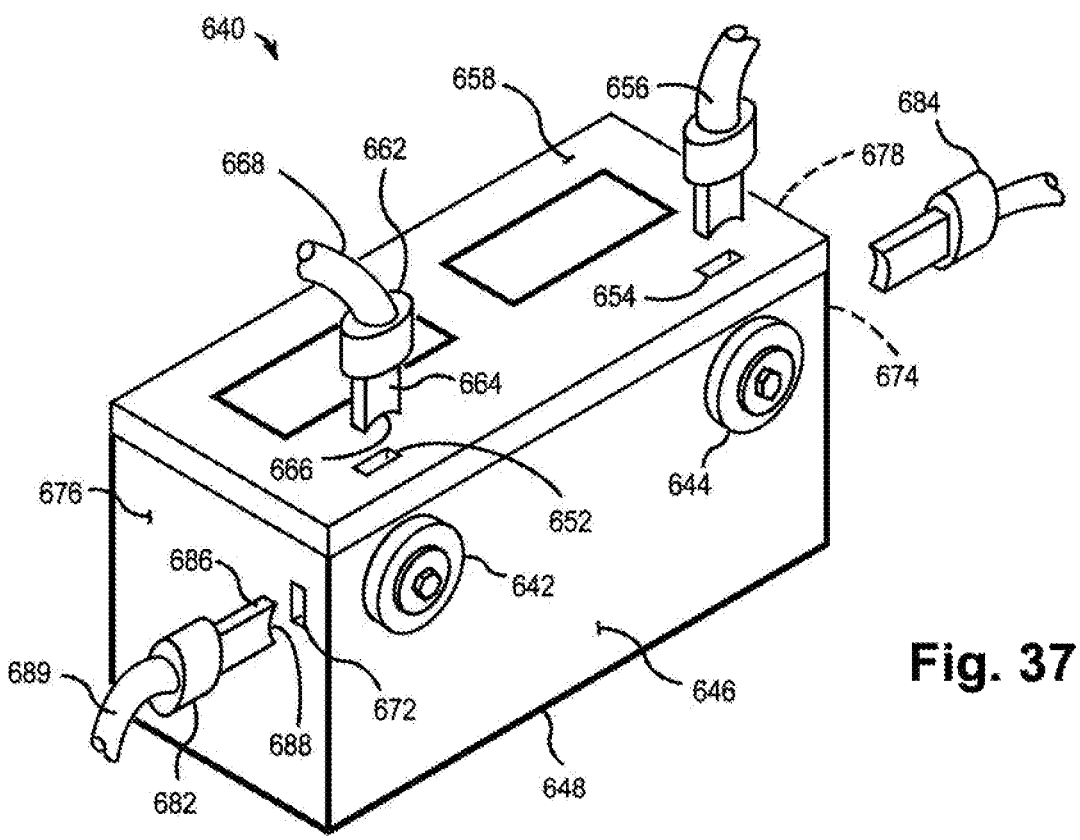
Fig. 37
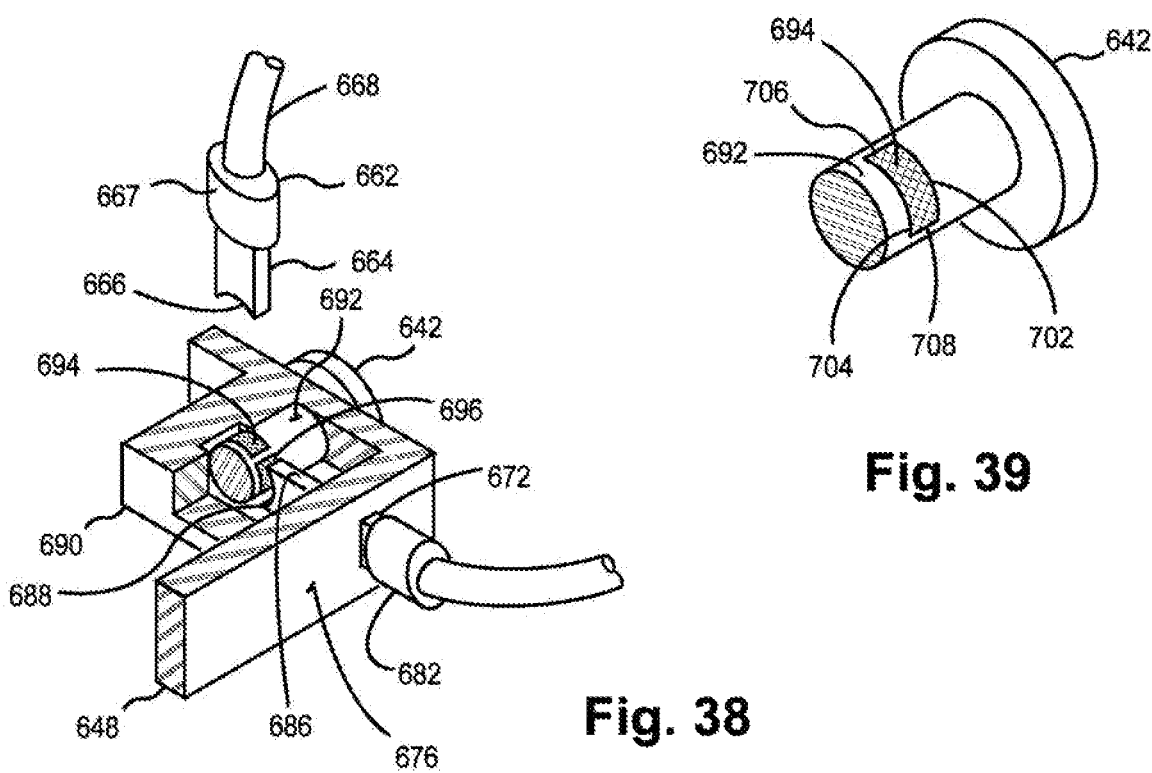
Fig. 39
Fig. 38

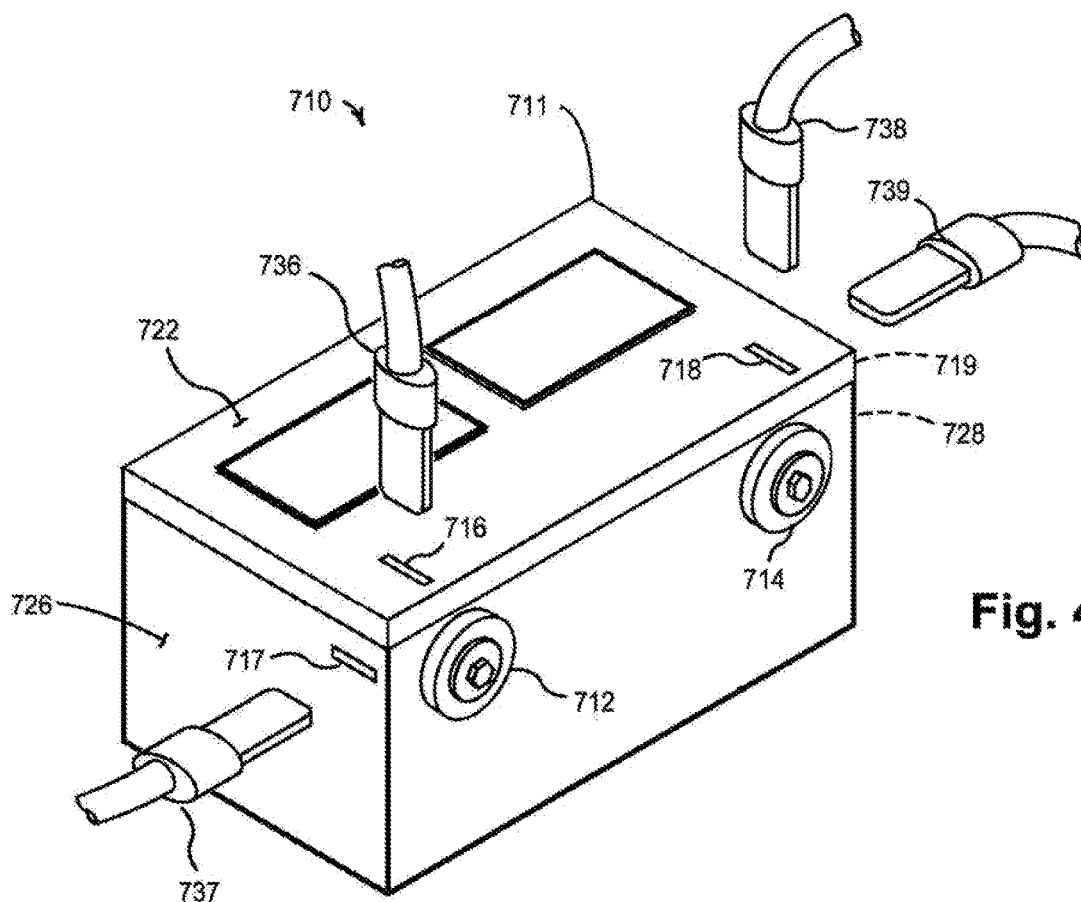
Fig. 40
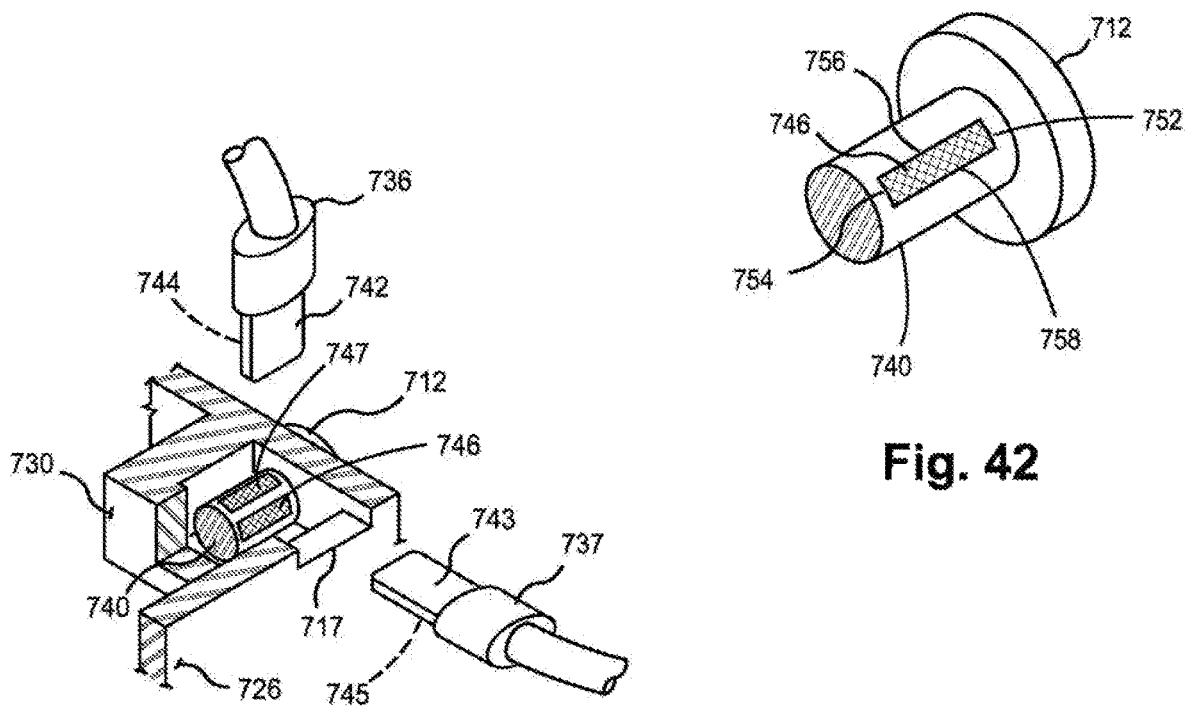
Fig. 41
Fig. 42

AUTOMOTIVE BATTERY WITH INTEGRAL ELECTRICAL CONTACT SLOTS

FIELD OF THE INVENTION

This invention relates to automotive batteries and, in particular, to automotive batteries incorporating integral electrical contact slots to facilitate a battery charging operation without the need for a conventional battery booster cable with battery terminal clamps.

BACKGROUND OF THE INVENTION

FIG. 1 is a simplified diagrammatical illustration of a typical, conventional automotive lead acid battery 10 that includes a positive battery terminal 12, a negative battery terminal 14, a battery casing 16, and a battery cover 18. The battery 10 includes battery terminal bases 22 at the battery terminals 12, 14. The battery cover 18 is sealed to the battery casing 16, forming a leakproof battery housing 20, to prevent leakage of internal battery electrolyte solution from the battery 10. Vent caps 24 are provided in the battery cover 18 to prevent buildup of gases in the battery housing 20.

As shown in FIG. 2, a conventional booster cable 30 typically includes "positive" battery terminal clamps 32 and "negative" battery terminal clamps 34 featuring spring-loaded serrated jaws for attachment. The positive battery terminal clamps 32 are connected to opposite ends of a positive insulated electrical conductor 36 and the negative battery terminal clamps 34 are connected to opposite ends of a negative insulated electrical conductor 38. The insulated electrical conductors 36, 38 each have sufficient cross-sectional areas to safely conduct high amperage engine starter current.

FIG. 3 is a simplified, generic diagrammatical illustration of the battery 10 with the battery cover 18 and the front and sides of the battery casing 16 removed to show typical internal battery components. The positive battery terminal 12 is electrically connected to a positive battery post 42 and the negative battery terminal 14 is electrically connected to a negative battery post 44, where both the battery posts 42, 44 extend below the battery cover 18 into the battery casing 16.

The battery 10 includes a plurality of battery cells 52 arranged in a parallel configuration with a plurality of intercell partitions 54 separating adjacent battery cells 52. The number of battery cells 52 determines the total voltage output of the battery 10. In the configuration shown, each battery cell 52 includes two positive plates 62 and two negative plates 64, where each positive plate 62 is separated from an adjacent negative plate 64 by a plate separator 66. The plates 62, 64 and the plate separators 66 are normally immersed in battery electrolyte solution (not shown).

The six battery cells 52 are electrically connected in series by five intercell connectors 56. Each intercell connector 56 electrically connects two positive plates 62 in one battery cell 52 to two negative plates 64 in an adjacent battery cell 52. The positive battery post 42 is mounted on a positive plate strap 58 that is electrically connected to at least two positive plates 62. Similarly, the negative battery post 44 is mounted on a negative plate strap 68 that is electrically connected to at least two negative plates 64. Electrical connection to the battery 10 is conventionally made at the respective outer surfaces of the positive battery terminal 12 and the negative battery terminal 14.

As is tolerated in common usage, the booster cable 30 suffers from the shortcoming that the serrated jaws of the booster cable clamps 32, 34, typically made from copper or a copper alloy, produce indentations and scratches on the softer lead alloy battery terminals 12, 14, or on lead alloy engine battery terminal clamps (not shown) secured to the battery terminals 12, 14. Over time, clamping and unclamping operations produces deterioration of the lead alloy surfaces from repeated attachment of the booster cable 30, especially when a user twists and turns the booster cable clamps 32, 34 to insure good electrical connections.

Another shortcoming is that one or both of the booster cable clamps 32, 34 may accidentally make contact with the vehicle chassis or metal engine components when a user attaches or removes the conventional booster cable 30. A further shortcoming is that the process of connecting the booster cable 30 typically requires the use of both hands to prevent the booster cable clamps 32, 34 from accidentally contacting each other. Additionally, there is a finite probability that an electrical spark created between a booster cable clamp and a battery terminal post may ignite hydrogen gas produced by battery overcharging.

What is needed is a battery charging apparatus that overcomes the limitations of the prior art by: (i) providing a method of electrically connecting automotive batteries without causing surface damage to battery terminals and to battery clamps, (ii) assuring proper polarity when connecting a source battery to a discharged battery, and (iii) preventing generation of electrical sparks that may cause hydrogen gas ignition.

BRIEF SUMMARY OF THE INVENTION

The invention results from the observation that an electrical connection to a battery for the purpose of charging can be made via encased electrical contact slots, inside the battery housing, terminating at battery posts, thus bypassing the external battery terminals.

In an aspect of the present invention, an automotive battery with a positive battery post providing an electrical path between a positive battery terminal and a positive plate strap, and a negative battery post providing an electrical path between a negative battery terminal and a negative plate strap includes: a positive contact slot encasement inside the battery, the positive contact slot encasement enclosing a positive contact slot and at least a portion of the positive battery post, the positive contact slot having a first opening in a battery housing, the positive contact slot providing access to a positive battery post contact region so as to allow insertion of a positive electrical prong into the first opening whereby a positive prong contact surface is placed into electrical contact with the positive battery post; and, a negative contact slot encasement inside the battery, the negative contact slot encasement enclosing a negative contact slot and at least a portion of the negative battery post, the negative contact slot having a second opening in the battery housing, the negative contact slot providing access to a negative battery post contact region so as to allow for insertion of a negative electrical prong into the second opening whereby a negative prong contact surface is placed into electrical contact with the negative battery post.

In another aspect of the present invention, an automotive battery with (i) a positive battery terminal on a battery housing connected to a positive battery post inside the battery housing, the positive battery post providing an electrical path between the positive battery terminal and a positive plate strap in the battery housing, and (ii) a negative battery terminal on the battery housing connected to a negative battery post inside the battery housing, the negative battery post providing an electrical path between the negative battery terminal and a negative plate strap in the battery housing, includes: a positive contact slot encasement inside the battery housing, the positive contact slot encasement having a positive cavity side wall attached to the battery housing, a positive cavity end wall attached to the battery housing, and a positive cavity base attached to both positive cavity walls, the positive contact slot encasement enclosing at least a portion of the positive battery post; a positive contact slot having a first opening in the battery housing to provide for insertion of a positive electrical prong into the positive contact slot encasement, the positive electrical prong having a contact surface for electrically contacting a positive post electrical contact region on a positive battery post surface when inserted into the positive contact slot encasement; a negative contact slot encasement inside the battery housing, the negative contact slot encasement having a negative cavity side wall attached to the battery housing, a negative cavity end wall attached to the battery housing, and a negative cavity base attached to both negative cavity walls, the negative contact slot encasement enclosing at least a portion of the negative battery post; and a negative contact slot having a second opening in the battery housing to provide for insertion of a negative electrical prong into the negative contact slot encasement, the negative electrical prong having a contact surface for electrically contacting a negative post electrical contact region on a negative battery post surface when inserted into the negative contact slot encasement.

In yet another aspect of the present invention, a charging system suitable for charging a drained battery using a source battery includes: a source battery connection adapter having a positive source electrical plug for electrically connecting to a source positive battery post via a source positive contact slot, and a negative source electrical plug for electrically connecting to a source negative battery post via a source negative contact slot; a drained battery connection adapter having a positive insulated electrical conductor for electrically connecting to a drained positive battery terminal, and a negative insulated electrical conductor for electrically connecting to a drained negative battery terminal; and, an adapter connection cable configured to be electrically connected both to the source battery connection adapter and to the drained battery connection adapter so as to form a battery interconnection cable assembly such that, when the battery interconnection cable assembly is electrically connected both to the source battery and to the drained battery, the battery interconnection cable assembly provides a positive electrical path between the source positive battery post and the drained positive battery terminal, and provides a negative electrical path between the source negative battery post and the drained negative battery terminal.

The additional features and advantage of the disclosed invention is set forth in the detailed description which follows, and will be apparent to those skilled in the art from the description or recognized by practicing the invention as described, together with the claims and appended drawings.

BRIEF DESCRIPTION OF THE DRAWINGS

The uses and advantages of the present invention will be more fully appreciated as the same becomes better understood from the following detailed description of the present invention when viewed in conjunction with the accompanying figures, in which:

FIG. 37 is a simplified diagrammatical illustration of a side terminal automotive battery with a vertical positive contact slot and a vertical negative contact slot in a battery casing, and with a positive contact slot and a negative contact slot in a battery cover, in accordance with the present invention;

FIG. 38 is a cross-sectional detail cutaway view of the battery of FIG. 34 showing a positive battery post and two positive electrical plugs positioned for insertion into the two positive contact slots;

FIG. 39 is an isometric diagrammatical illustration of the battery post of FIG. 34 showing a lateral convex electrical contact region on the surface;

FIG. 40 is a simplified diagrammatical illustration of a side terminal automotive battery with a horizontal positive contact slot and a horizontal negative contact slot in a battery casing, and with a positive contact slot and a negative contact slot in a battery cover, in accordance with the present invention;

FIG. 41 is a cross-sectional detail cutaway view of the battery of FIG. 37 showing a positive battery post and two positive electrical plugs positioned for making electrical connections to the positive battery post;

FIG. 42 is an isometric diagrammatical illustration of the battery post of FIG. 38 showing a longitudinal convex electrical contact region on the surface;

DETAILED DESCRIPTION OF THE INVENTION

Various exemplary embodiments of the present invention are described in the specification below, each with reference to the appropriate Figure(s). It should be understood that, for clarity of illustration, not all disclosed battery and cable components are shown to the same scale, or in correct proportion to one another, and should not be taken as literal illustrations of actual battery and cable components. In addition, although some battery components and innovative modifications are presented with straight edges, angular corners, and flat surfaces, present-day manufacturing methods can produce these components having, rounded edges, corner fillets, and curved surfaces. Also, the S.A.E. top-terminal batteries and side-terminal batteries shown are merely representative of the various configurations of automobile lead acid batteries in widespread usage, and the illustrations shown are generalized and should not be taken as limiting the application of the present invention. In particular, the disclosed battery charging cable components can be utilized for L-terminal batteries, for stud-terminal batteries, and for combined S.A.E. and stud type batteries.

The present invention provides novel battery housing configurations which enable an electrical charging connection to be made internally, at battery posts, instead of externally, at battery terminals. These novel configurations provide for two or more polarized recessed electrical contact slots, extending from the battery cover and/or the battery casing, into encasements in the battery housing, as described in greater detail below. The electrical contact slots: (i) enable electrically connecting to a battery without causing surface damage to battery terminals or to engine battery clamps, (ii) assure proper polarity between a source battery and a discharged battery, (iii) reduce the possibility of hydrogen gas ignition from electrical sparks at a battery terminal, and (iv) provide for top, front, and side electrical charging connections on the battery to accommodate different engine compartment layouts.

Figure 1:
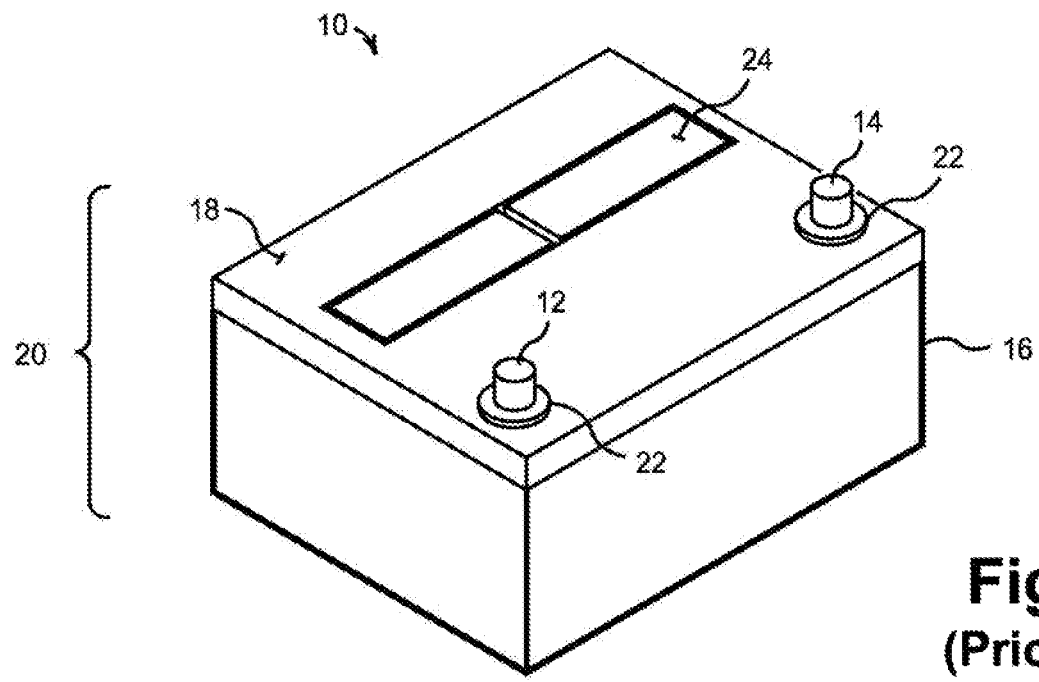
FIG. 1 is a diagrammatical illustration of an automotive lead acid battery showing a battery housing with positive and negative battery terminals on a battery cover, in accordance with the present state of the art.
Figure 2:
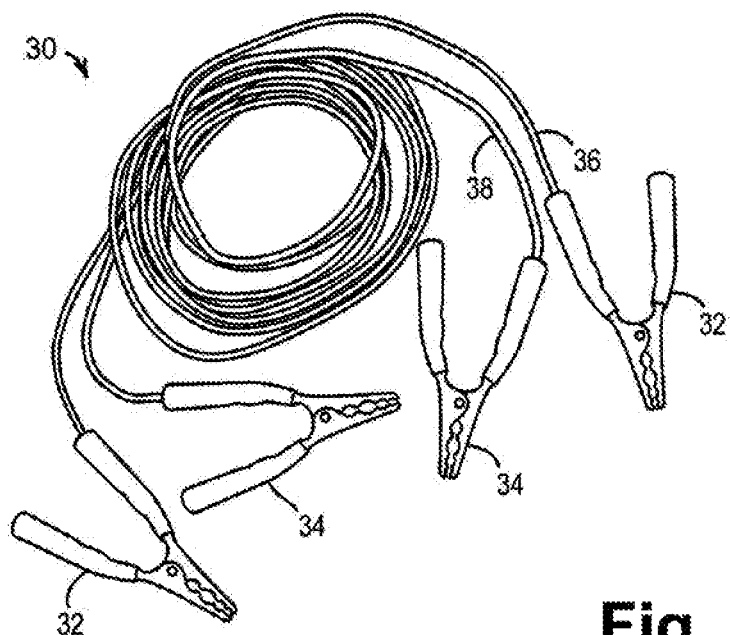
FIG. 2 is a diagrammatical illustration of a conventional booster cable including booster cable clamps connected to opposite ends of a pair of insulated electrical conductors, in accordance with the present state of the art.
Figure 3:
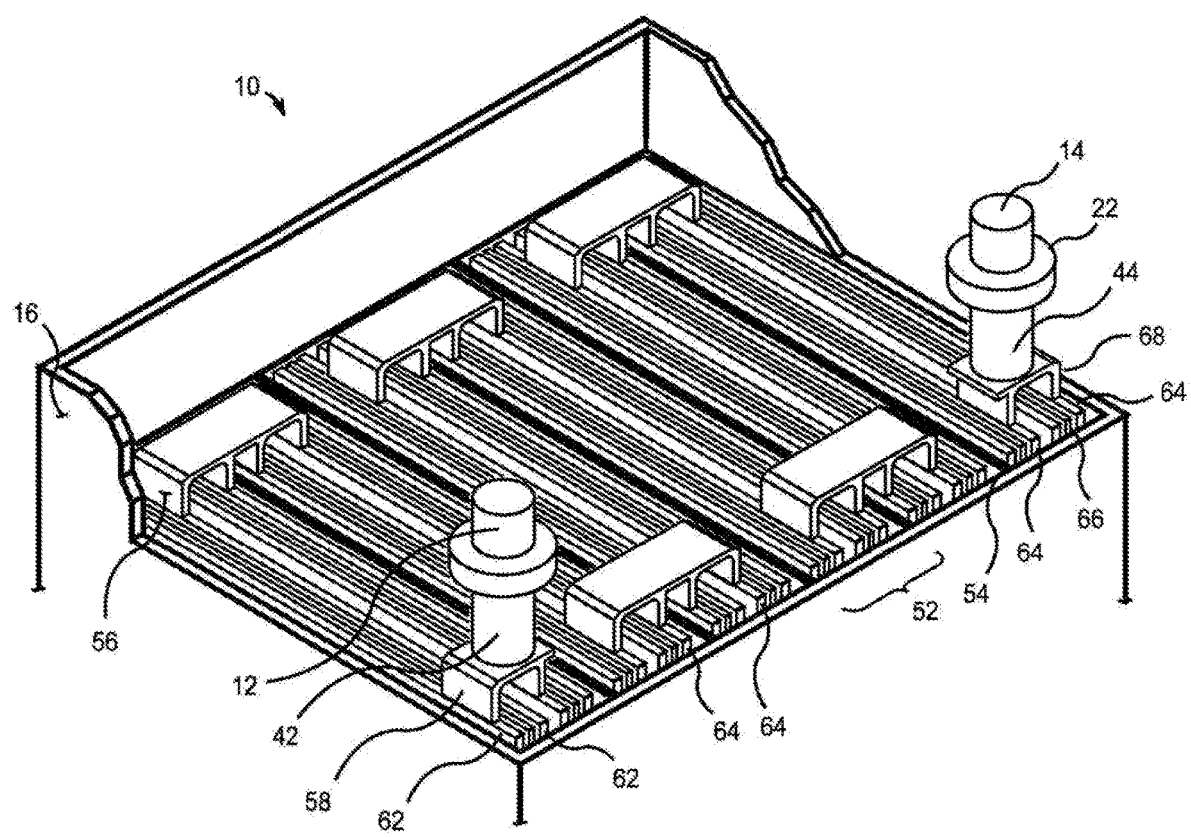
FIG. 3 is a diagrammatical illustration of the internal configuration of the battery of FIG. 1 with the battery cover removed to show battery posts, internal battery plates, and intercell connectors.
Figure 4:
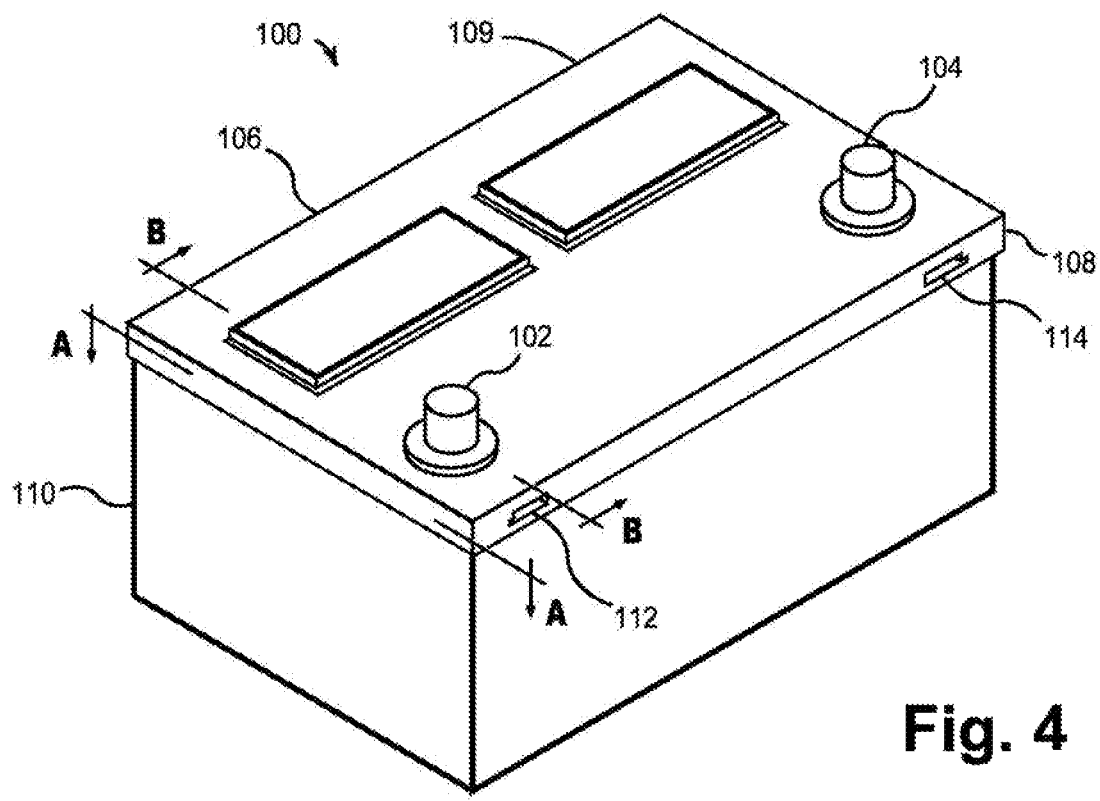
FIG. 4 is a simplified diagrammatical illustration of an automotive battery with a positive contact slot and a negative contact slot at the front of a battery cover, in accordance with the present invention.

An exemplary embodiment of a battery 100, configured in accordance with the present invention, is shown in the simplified diagrammatical illustration of FIG. 4. The battery 100 includes a positive battery terminal 102, a negative battery terminal 104, a battery cover 106, and a battery casing 110. The battery cover 106 is typically permanently attached to the battery casing 110 by a battery cover flange seal 108 using thermal bonding or chemical adhesive means to form a battery housing 109. The battery 100 also includes a positive contact slot 112 and a negative contact slot 114, both contact slots 112, 114 passing through the battery cover flange seal 108 and the battery casing 110 and into the battery 100. The positive contact slot 112 and the negative contact slot 114 mate with external electrical connectors (not shown) for charging purposes, as described in greater detail below.

Figure 5:
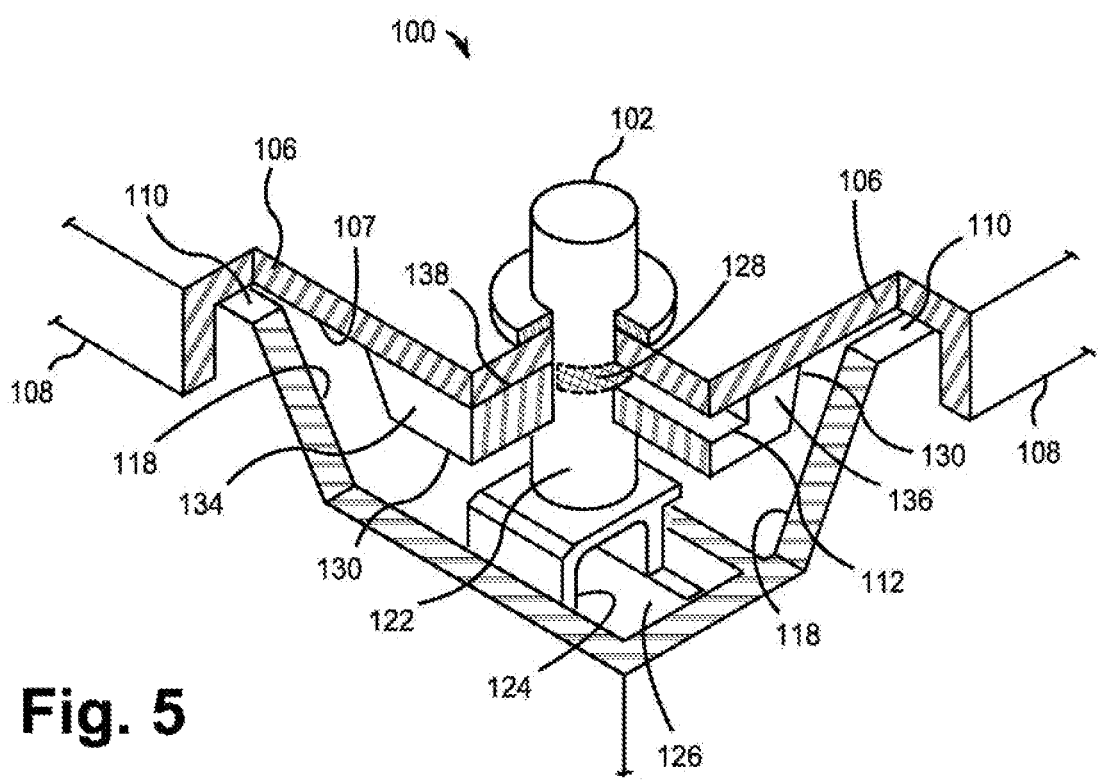
FIG. 5 is an assembly cutaway view of part of the battery of FIG. 4 showing a positive battery post, the positive contact slot, and a positive contact slot encasement.

FIG. 5 is a simplified detail diagrammatical illustration of part of the battery 100 at the positive battery terminal 102. For clarity of illustration, the wall thicknesses of the battery cover flange seal 108 and the battery casing 110 have been exaggerated to allow cross-sectional hatch lines to be seen. The assembly cutaway view shows a positive plate strap 124 electrically connected to an internal positive battery plate 126. The positive battery terminal 102 is part of a positive battery post 122, where the positive battery post 122 lies entirely inside the battery 100.

A positive contact slot encasement 130 encloses the positive contact slot 112 and part of the positive battery post 122. The positive contact slot encasement 130 is configured to provide a leak-proof seal at the positive battery post 122 so as to prevent battery electrolyte solution (not shown) from seeping into the positive contact slot 112. In an exemplary embodiment, the positive contact slot encasement 130 may be formed as an integral part of the battery cover 106. Alternatively, the positive contact slot encasement 130 may be fabricated as a separate component, and bonded to a battery cover internal surface 107 during battery assembly, as indicated by a bonding interface 138. An adhesive or sealant (not shown) may be applied between: (i) a positive encasement side surface 134 and a battery casing internal surface 118, and (ii) a positive encasement front surface 136 and the battery casing internal surface 118 to further prevent leakage of the battery electrolyte solution.

In an exemplary embodiment, the positive contact slot 112 provides openings in the battery cover flange seal 108 and the battery casing 110, and extends into the positive contact slot encasement 130, whereby a positive post electrical contact region 128 on the convex surface of the positive battery post 122 is made accessible to an external electrical connector (not shown). It can be appreciated that the electrical contact surface area provided by the positive post electrical contact region 128 can exceed the aggregate electrical contact surface area available on a battery terminal engaged by the opposed teeth of a conventional jumper cable battery clamp. Providing this larger electrical interface area, i.e., the positive post electrical contact region 128, can advantageously result in a smaller voltage drop at the positive battery post 122 in comparison to using a conventional jumper cable clamp at the positive battery terminal 102.

Figure 6:
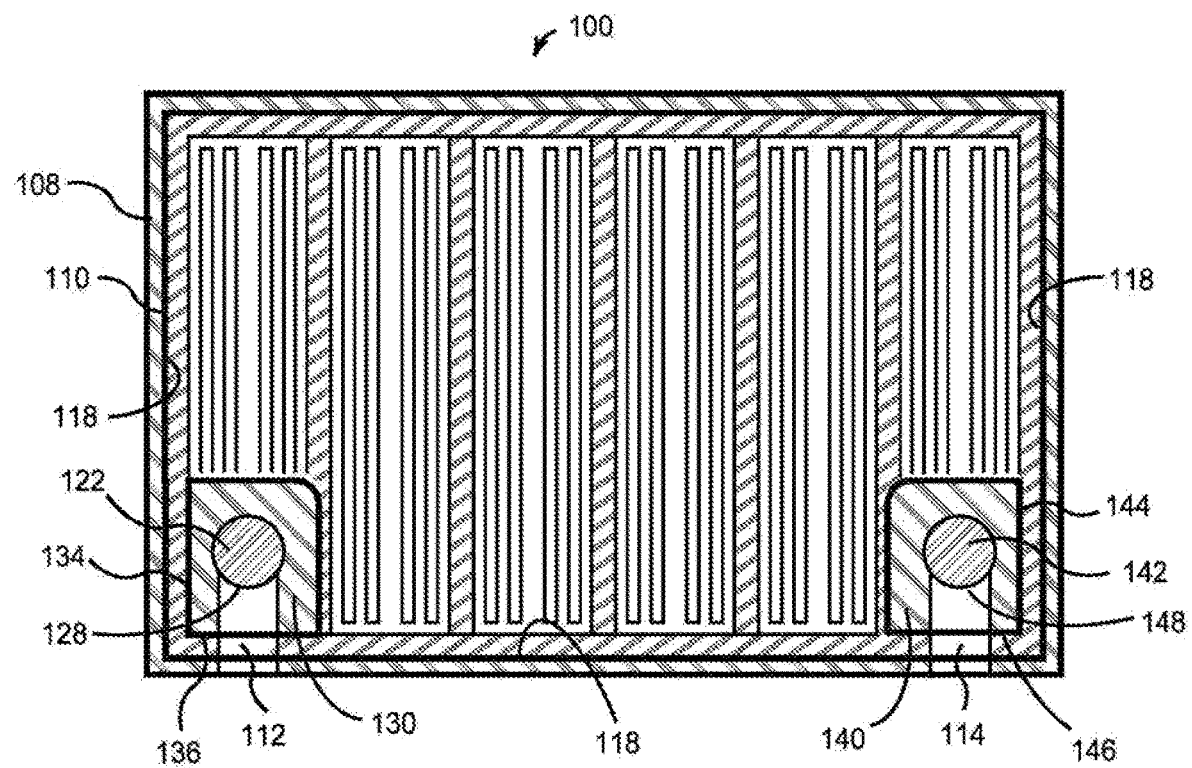
FIG. 6 is a cross-sectional plan view of the battery of FIG. 4 taken across a section plane A-A as shown in FIG. 4.

FIG. 6 is a cross-sectional plan view A-A of the battery 100, taken across the section plane A-A as indicated in FIG. 4. In this view, it can be seen that the positive post electrical contact region 128 is directly accessible to a suitably configured electrical prong (not shown) that is sized and shaped to enter the positive contact slot 112, to pass through the battery cover flange seal 108, and to pass through the battery casing 110 into the positive contact slot encasement 130. The illustration more clearly shows the positive encasement side surface 134 and the positive encasement front surface 136 as disposed against the battery casing internal surface 118. A negative battery post 142 is partially enclosed by a negative contact slot encasement 140 that also encloses the negative contact slot 114. Similarly, a negative post electrical contact region 148 on the negative battery post 142 is directly accessible to a negative electrical prong (not shown) via the negative contact slot 114. Note that a negative encasement front surface 146 and a negative encasement side surface 144 are disposed against the battery casing internal surface 118 to prevent seepage of battery electrolyte solution (not shown) into the negative contact slot 114.

Figure 7:
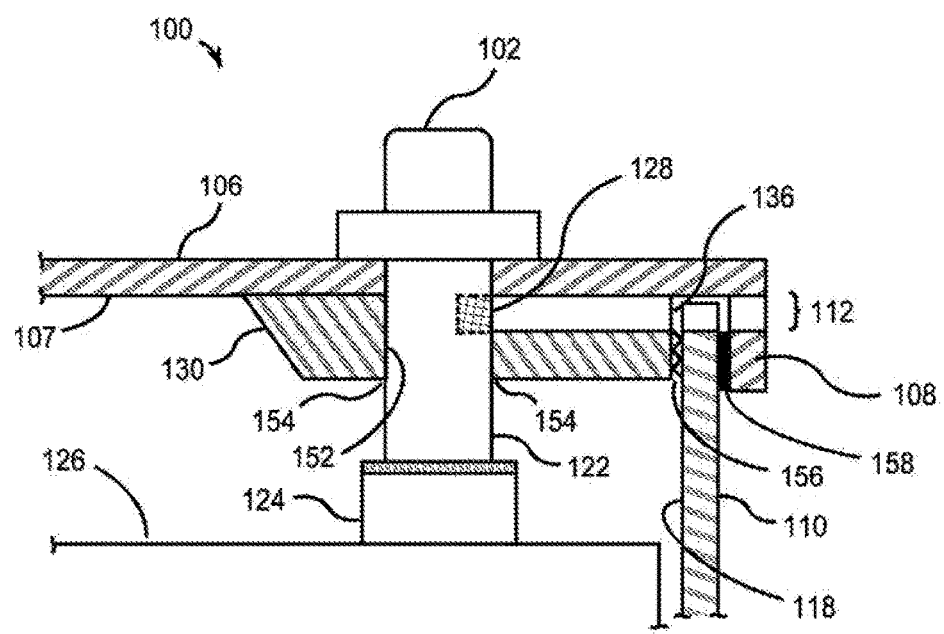
FIG. 7 is a cross-sectional detail view of the positive battery terminal of FIG. 4 and the positive contact slot, taken across a section plane B-B as shown in FIG. 4.

FIG. 7 is a cross-sectional detail view B-B of the positive battery terminal 102 and the positive contact slot 112 of the battery 100, taken across the section plane B-B through the battery cover 106, as indicated in FIG. 4 except that, for clarity of illustration, the section plane B-B does not pass through the positive battery terminal 102, nor through the positive battery post 122. The positive battery post 122 functions as an electrical conductor from the positive battery terminal 102, to the positive plate strap 124, and to the positive battery plate 126. As can be appreciated by one skilled in the relevant art, the battery 100 can be charged, or can be used to provide an electrical charge to another battery, by inserting a compatible electrical plug (not shown) into the positive contact slot 112 to make electrical contact with the positive post electrical contact region 128 on the positive battery post 122.

The illustration provides additional detail showing that the positive contact slot 112 extends through the battery cover flange seal 108, through the battery casing 110, and into the positive contact slot encasement 130 to expose the positive post electrical contact region 128. A positive encasement through hole 152 in the positive contact slot encasement 130 may have substantially the same diameter as the positive battery post 122 at a circular leakproof interface 154, so as to prevent battery electrolyte solution (not shown) from seeping into the positive contact slot 112. The positive encasement front surface 136 is disposed against the battery casing internal surface 118 to provide for optional application of an electrolyte-resistant sealant 156 during a battery fabrication step. The battery cover flange seal 108 is typically permanently bonded to the battery casing 110, as represented by a bonding interface 158.

Figure 8:
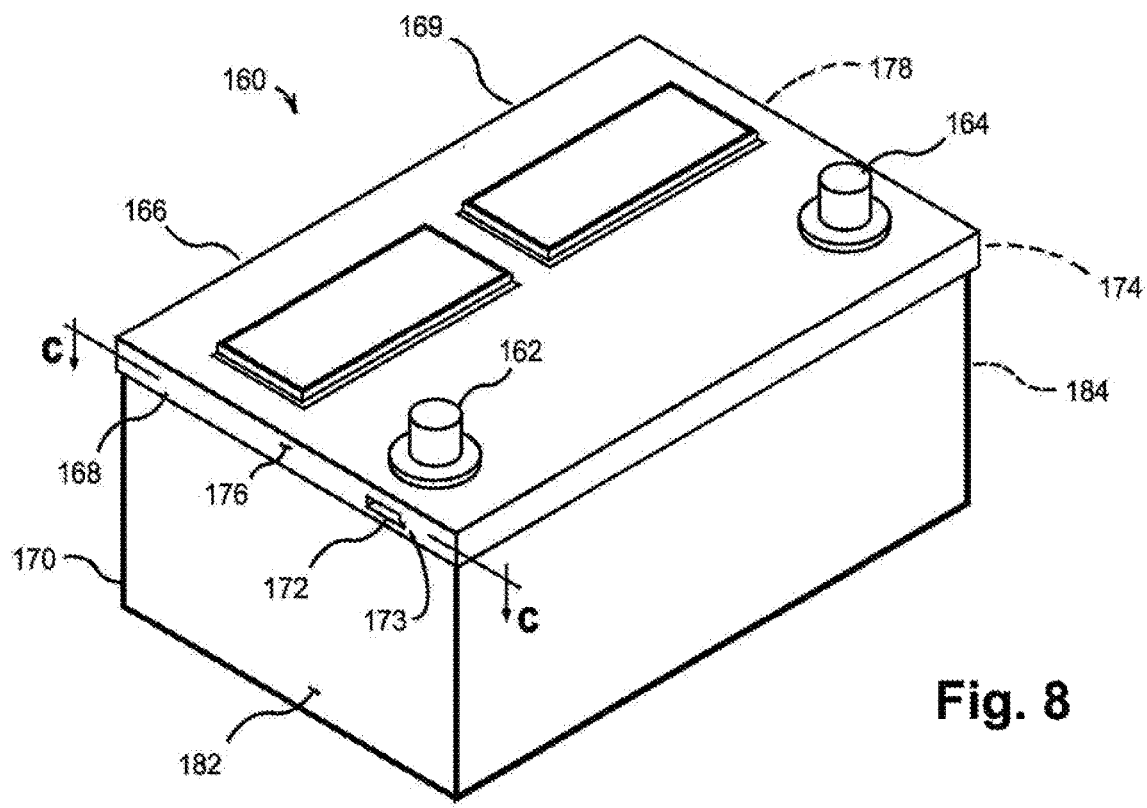
FIG. 8 is a simplified diagrammatical illustration of an automotive battery with positive and negative contact slots at the sides of a battery cover, in accordance with the present invention.

FIG. 8 is a simplified diagrammatical illustration of an exemplary embodiment of a battery 160, in accordance with the present invention, that includes a positive battery terminal 162 and a negative battery terminal 164 on a battery cover 166 attached to a battery casing 170 with a battery cover flange seal 168. The battery cover 166 and the battery casing 170 form a battery housing 169. In the configuration shown, a positive contact slot 172 provides an opening in a left flange 176 and in a left casing wall 182. A negative contact slot 174 (hidden) provides an opening in a right flange 178 and a right casing wall 184 (both hidden). The positive contact slot 172 includes an alignment groove 173. The negative contact slot 174 is a mirror image of the positive contact slot 172, and together form a polarized electrical contact slot pair.

Figure 9:
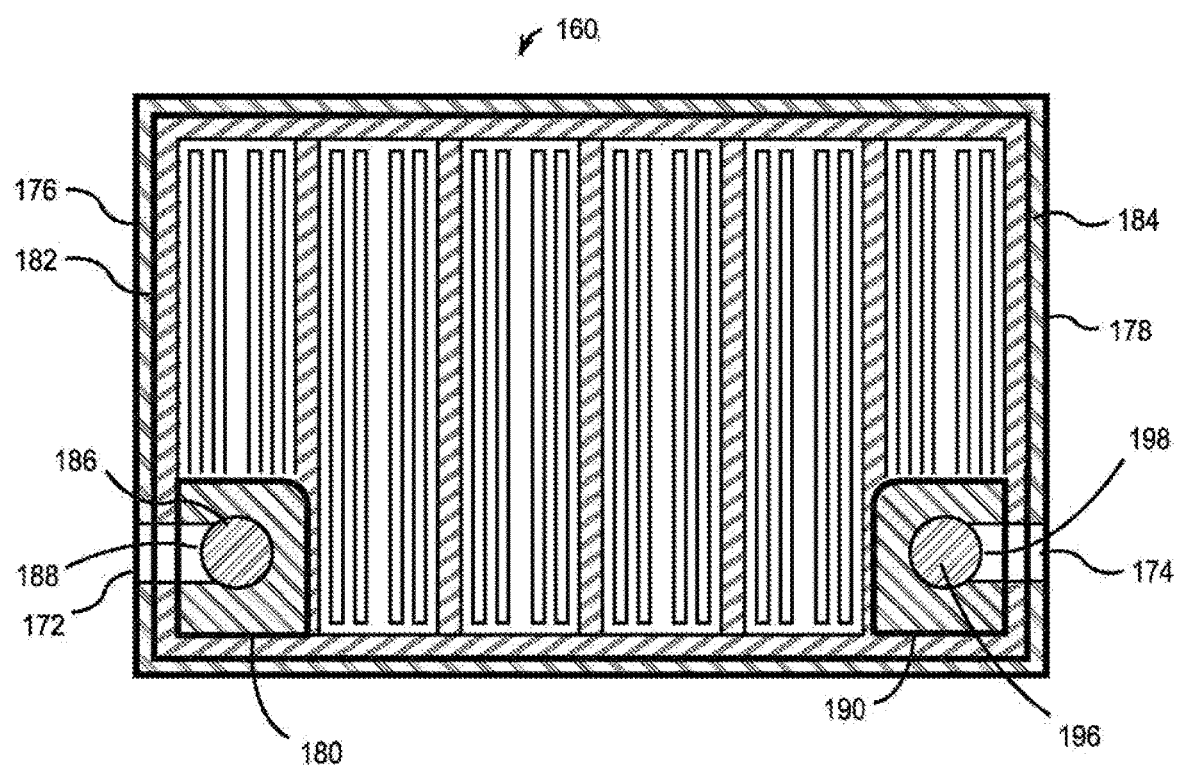
FIG. 9 is a cross-sectional plan view of the battery of FIG. 8 taken across a section plane C-C as shown in FIG. 8.

FIG. 9 is a cross-sectional plan view C-C of the battery 160, taken across the section plane C-C as indicated in FIG. 8. This view more clearly shows a positive battery post 186 and the positive contact slot 172 enclosed by a positive contact slot encasement 180. Also seen is the left flange 176 disposed against the left casing wall 182, and the right flange 178 disposed against the right casing wall 184. A positive post electrical contact region 188 is directly accessible to a suitably configured electrical prong (not shown) that is sized and shaped for insertion into the positive contact slot 172. A negative battery post 196 and the negative contact slot 174 are enclosed by a negative contact slot encasement 190. A negative post electrical contact region 198 is directly accessible to a negative electrical prong (not shown) via the negative contact slot 174.

Figure 10:
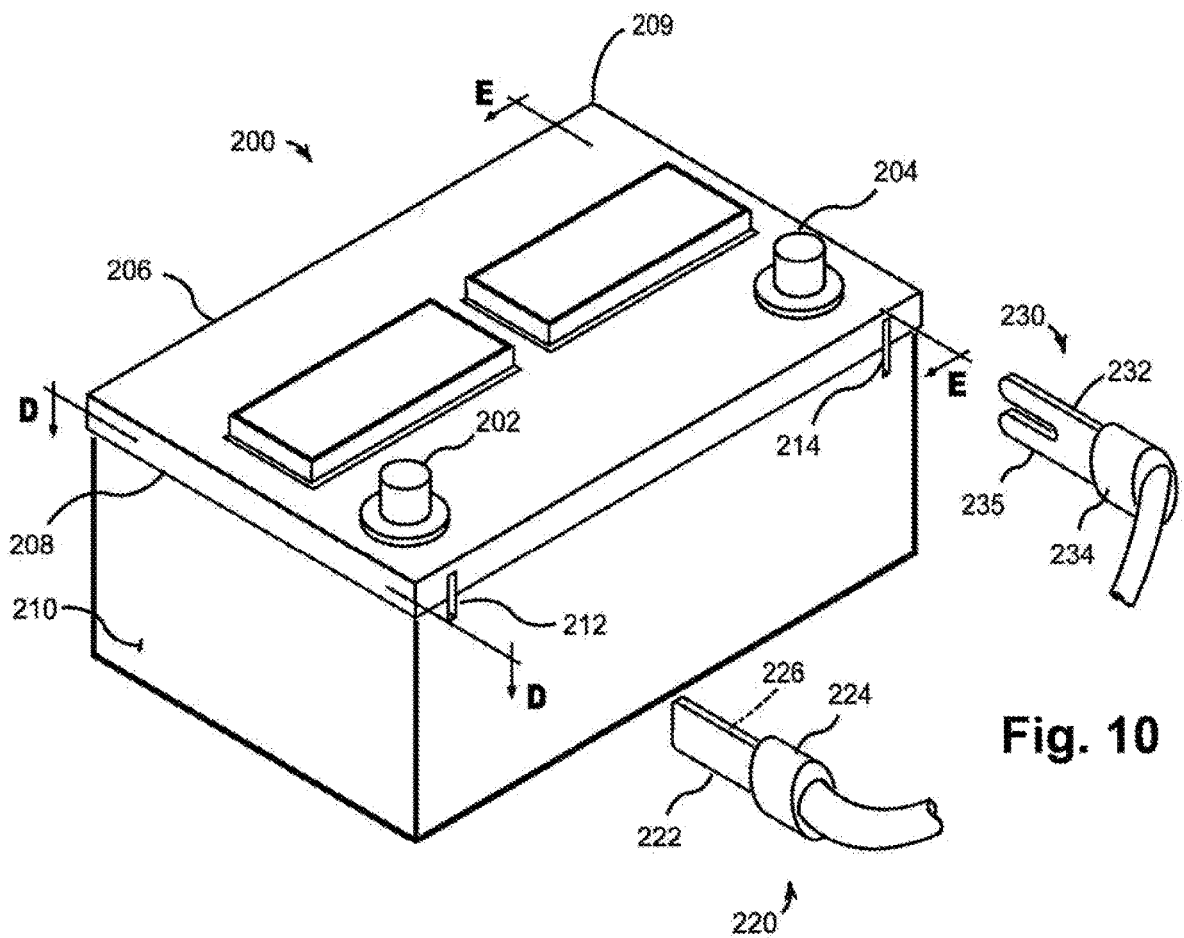
FIG. 10 is a simplified diagrammatical illustration of an automotive battery with a vertical positive contact slot and a negative contact slot at the front of a battery housing, in accordance with the present invention.

In an exemplary embodiment, FIG. 10 shows a simplified diagrammatical illustration of a battery 200, that includes a battery cover 206 and a battery casing 210, with a positive battery terminal 202 and a negative battery terminal 204 in the battery cover 206. The battery cover 206 and the battery casing 210 form a battery housing 209. Included in the battery 200 is a positive contact slot 212 and a negative contact slot 214, both passing through a battery cover flange seal 208 and through the battery casing 210. A positive electrical plug 220 may be provided for insertion into the positive contact slot 212 by grasping a plug grip 224 such that the longer dimension of a positive electrical prong 222 is vertically oriented, and such that a positive prong contact surface 226 (hidden) faces the positive battery terminal 202. Similarly, a negative electrical plug 230 may be grasped by a plug grip 234 such that the longer dimension of a negative electrical prong 232 is vertically oriented for insertion into the negative contact slot 214, and such that a negative prong contact surface 235 faces the negative battery terminal 204.

Figure 11:
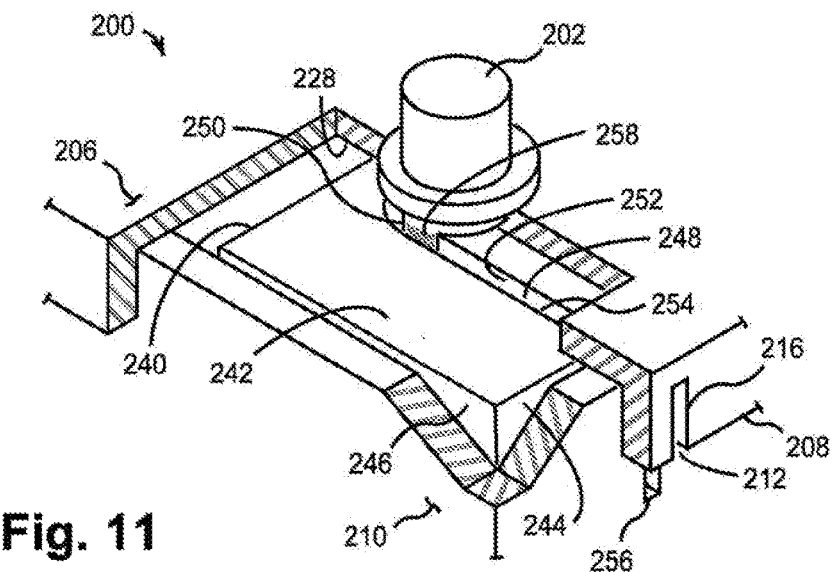
FIG. 11 is a cross-sectional detail cutaway view of the battery of FIG. 10 showing a positive battery post, the positive contact slot, and a positive contact slot encasement.

FIG. 11 is a close-up, partial cutaway, detail view of a corner of the battery 200 showing the positive battery terminal 202 with a corner portion of the battery cover 206 removed to expose a positive contact slot encasement 240 and a positive battery post 250. For clarity of illustration, the thicknesses of the battery cover 206, the battery cover flange seal 208, and the battery casing 210 have been exaggerated to enable cross-sectional hatch lines to be seen. In the configuration shown, a positive encasement top surface 242 may be bonded to a battery cover interior surface 228 using a layer of bonding compound (not shown) so as to seal around the positive battery post 250 and prevent battery electrolyte solution (not shown) from seeping into the positive contact slot 212. In an exemplary embodiment, the positive contact slot encasement 240 may be fabricated as part of the battery cover 206 and thus not require bonding.

The positive contact slot 212 includes a contact slot flange notch 216 that provides an opening in the battery cover flange seal 208. The positive contact slot 212 also includes a casing contact slot opening 256 in the battery casing 210. Inside the battery 200, the positive contact slot 212 includes a positive encasement channel 248 to guide the positive electrical prong 222 (shown in FIG. 10) to the positive battery post 250. The positive encasement channel 248 is defined by an encasement channel inner wall 252 and an encasement channel outer wall 254. The positive electrical prong 222 can be inserted through the contact slot flange notch 216 to make electrical contact with a positive post electrical contact region 258 on a convex surface of the positive battery post 250. A corner portion of the battery casing 210 has been removed to more clearly show a positive encasement side surface 246 and a positive encasement front surface 244. Bonding compound or a sealant (not shown) may be applied to either or both of the positive encasement surfaces 244, 246 during fabrication so as to prevent battery electrolyte solution (not shown) from seeping into the positive contact slot 212 after assembly.

Figure 12:
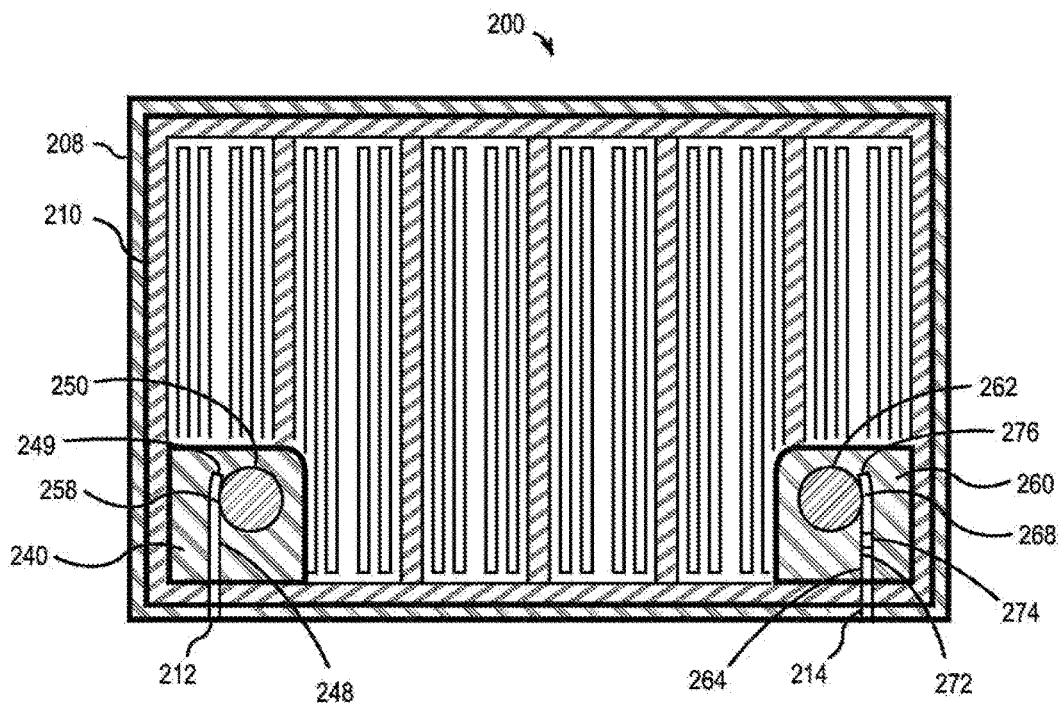
FIG. 12 is a cross-sectional plan view of the battery of FIG. 10 taken across a section plane D-D as shown in FIG. 10.

FIG. 12 is a cross-sectional plan view D-D of the battery 200, taken across the section plane D-D as indicated in FIG. 10, showing the positive contact slot encasement 240 and a negative contact slot encasement 260. In this plan view, it can be clearly seen that the positive post electrical contact region 258 is directly accessible to the positive electrical prong 222 (shown in FIG. 10) when inserted into the positive contact slot 212, through the battery cover flange seal 208, through the battery casing 210, along the positive encasement channel 248, up to an encasement channel terminus 249. Note that the encasement channel terminus 249 is slightly curved against the positive battery post 250. This configuration causes the inserted positive electrical prong 222 to be forced against the positive post electrical contact region 258 when the end of the positive electrical prong 222 is pushed into the encasement groove terminus 249. This action serves to increase the electrical contact area between the positive electrical prong 222 and the positive battery post 250 to thus reduce contact resistance. Similarly, a negative battery post 262 is partially enclosed in the negative contact slot encasement 260 that includes the negative contact slot 214 with an angled encasement channel terminus 276. There is a prong stop 274 on an encasement channel wall 272 of the negative contact slot 214. A negative post electrical contact region 268 is electrically accessible to the negative electrical prong 232, shown in FIG. 10, when fully inserted into the negative contact slot 214.

Figure 13:
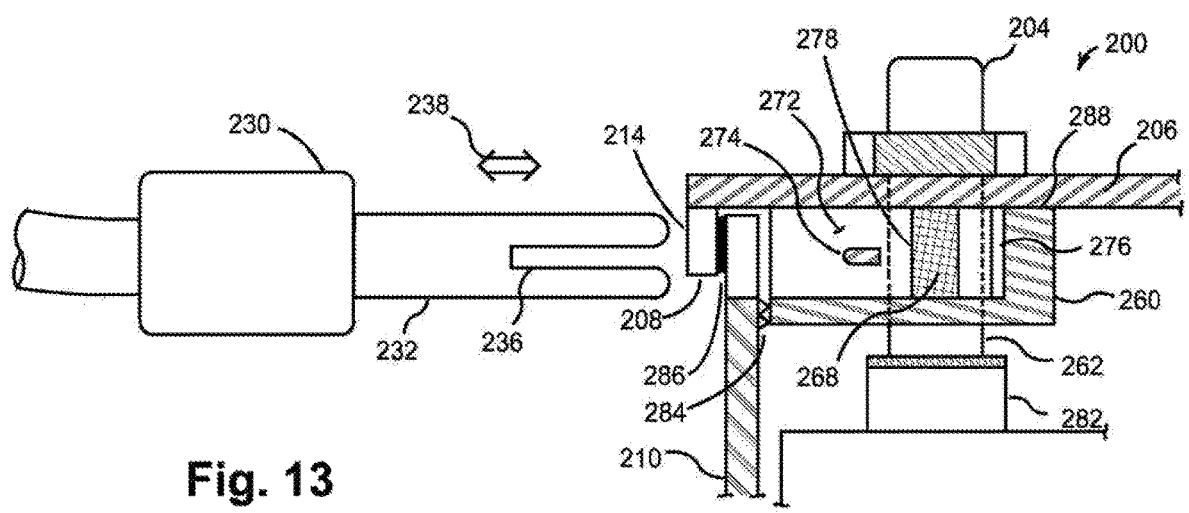
FIG. 13 is a cross-sectional plan view of the battery of FIG. 10 taken across a section plane E-E as shown in FIG. 10.

FIG. 13 is a cross-sectional detail view E-E of the negative battery terminal 204 and the negative contact slot 214 of the battery 200, taken across the section plane E-E as indicated in FIG. 10. A negative battery post 262 functions as an electrical conductor between the negative battery terminal 204 and a negative plate strap 282. An electrolyte-resistant sealant 284 may be applied between the negative contact slot encasement 260 and the battery casing 210 during fabrication to prevent battery electrolyte solution from subsequently seeping into the negative contact slot 214. The battery cover flange seal 208 may be chemically or thermally bonded to the battery casing 210 during fabrication, as indicated by a battery cover bonding interface 286. The negative contact slot encasement 260 may also be chemically or thermally bonded to the battery cover 206, as indicated by a negative encasement bonding interface 288, or may alternatively be formed as part of the battery cover 206 during fabrication.

Part of the negative battery post 262 protrudes through a post access opening 278 in the encasement channel wall 272 inside the negative contact slot encasement 260 to make the negative post electrical contact region 268 accessible to the negative electrical prong 232 of the negative electrical plug 230. To provide plug polarity, the negative electrical prong 232 includes a longitudinal prong slot 236 to allow for insertion and withdrawal, indicated by an arrow 238, of only the negative electrical prong 232 past the prong stop 274 located on the encasement channel wall 272 of the negative encasement channel 264 (seen in FIG. 12) to the angled encasement channel terminus 276. The prong stop 274 prevents inadvertent insertion of the positive electrical prong 222, shown in FIG. 10, into the negative contact slot 214. Conversely, the smaller vertical dimension of the positive contact slot 212 prevents inadvertent insertion of the larger negative electrical prong 232.

Figure 14:
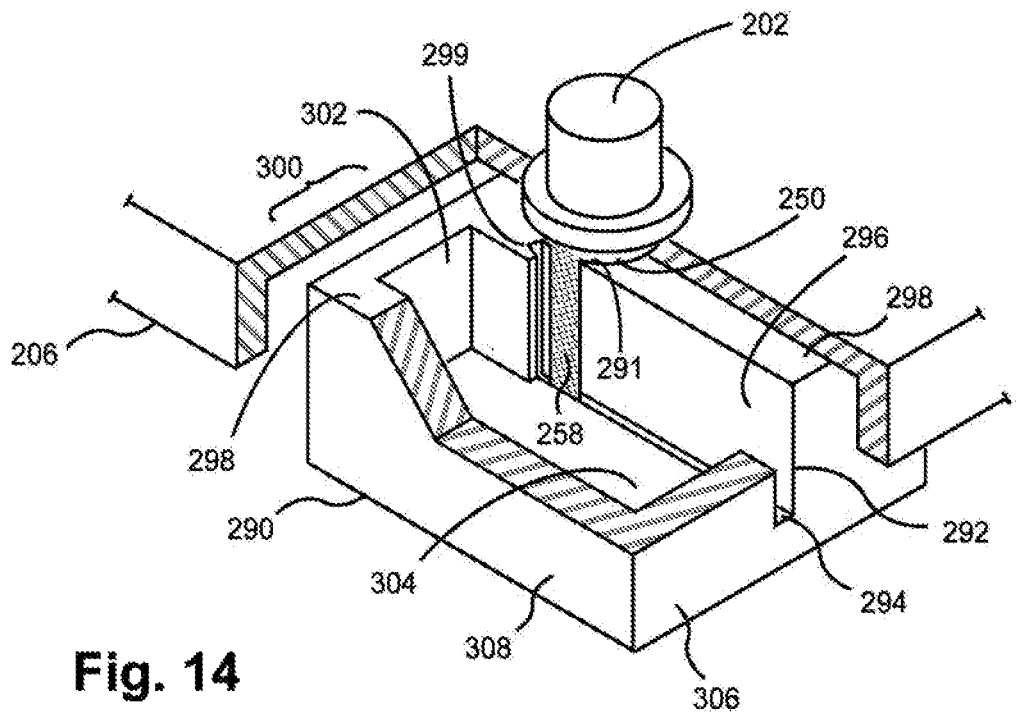
FIG. 14 is a cross-sectional detail cutaway view of the battery of FIG. 10 showing the positive battery post, an alternate configuration of a positive contact slot, and an alternate configuration of a positive contact slot encasement.

FIG. 14 is a diagrammatical illustration of an alternative design of a positive contact slot encasement 290 as may be used with the battery cover 206 and the positive battery terminal 202. A corner of the positive contact slot encasement 290 has been truncated to more clearly show a positive encasement cavity 300 bounded by a cavity side wall 296, a cavity end wall 302, and a cavity base 304. The positive battery post 250 is retained in an encasement through-hole 291 that extends from an encasement top surface 298 through the cavity base 304. It can be seen that prong guidance in the positive contact slot 292 is provided by an encasement groove 294 that is aligned with a corner formed by the cavity side wall 296 and the cavity base 304. The encasement groove 294 extends past the positive post electrical contact region 258 on the positive battery post 250 into an encasement prong terminus 299. The positive contact slot encasement 290 is here shown as a separate component configured for bonding to the battery cover 206 with an application of a bonding compound (not shown) to the encasement top surface 298, or by means of thermal bonding, during battery assembly. The positive contact slot encasement 290 may alternatively be fabricated as an integral part of the battery cover 206. Bonding compound may also be applied to one or both of an encasement front surface 306 and an encasement side surface 308 for bonding to the battery casing 210 (shown in FIG. 10).

Figure 15:
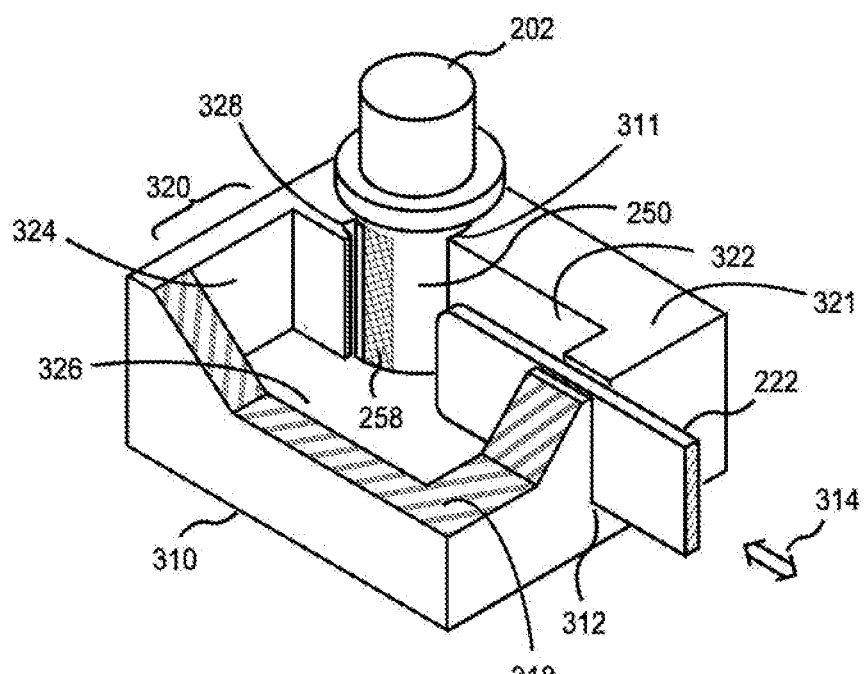
FIG. 15 is a cross-sectional detail cutaway view of the battery of FIG. 10 showing the positive battery post, another configuration of a positive contact slot, and another configuration of a positive contact slot encasement.

FIG. 15 is a diagrammatical illustration of another exemplary embodiment of a positive contact slot encasement 310 as may be used with the battery cover 206 (not shown) and the positive battery terminal 202 to enclose a positive contact slot 312 and part of the positive battery post 250. A corner of the positive contact slot encasement 310 has been truncated to more clearly show an encasement cavity 320 bounded by a cavity side wall 322, a cavity end wall 324, and a cavity base 326. The positive battery post 250 is retained in an encasement through-hole 311 that extends from an encasement top surface 321 through the cavity base 326. The illustration shows the insertion of the positive electrical prong 222 along the encasement cavity base 326, past the positive post electrical contact region 258 on the surface of the positive battery post 250, and into an encasement prong terminus 328. Insertion and removal of the positive electrical prong 222 is indicated by an arrow 314. Guidance for the positive electrical prong 222 is by the positive contact slot 312 in a relatively thick positive encasement front wall 318. Lateral movement (i.e., "wiggling") of the positive electrical prong 222 during insertion is restricted as the positive contact slot encasement 310 features: (i) the thick positive encasement front wall 318, providing for a long-length positive contact slot 312, and (ii) the narrow width of the positive contact slot 312 being sized to provide a sliding friction fit with the inserted positive electrical prong 222.

Figure 16:
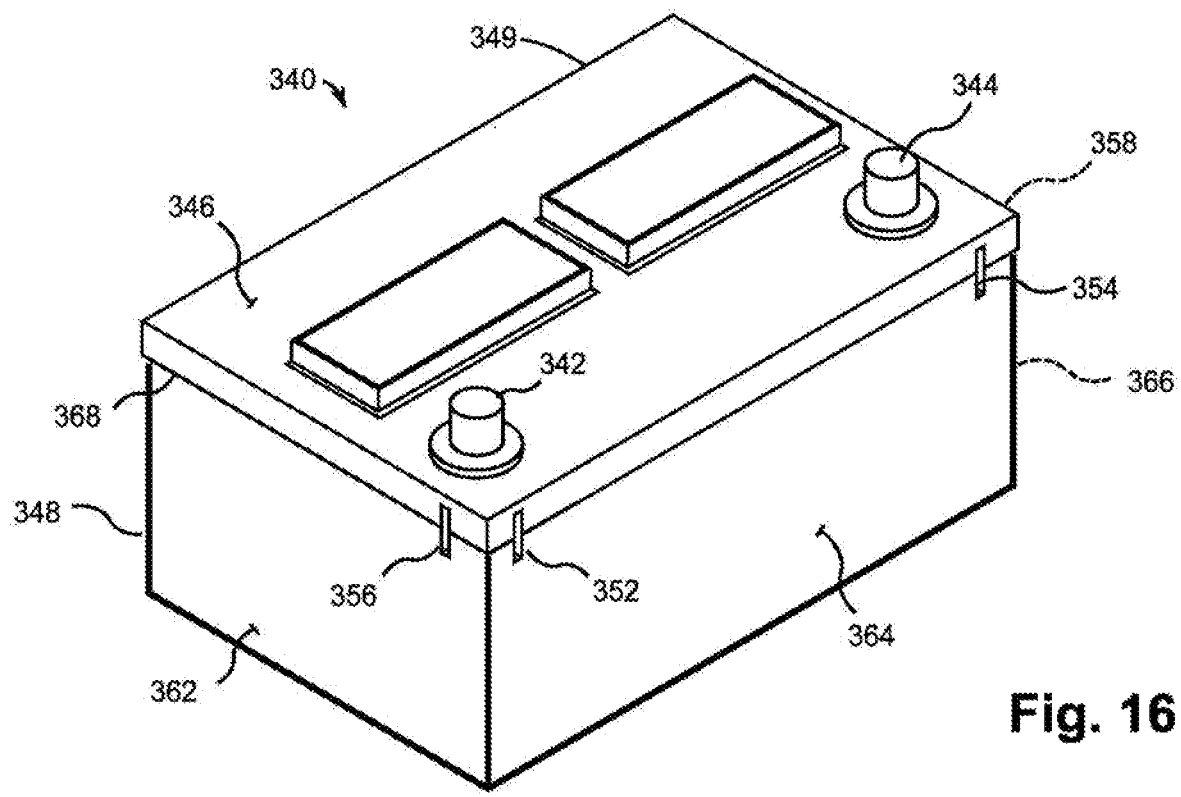
FIG. 16 is a simplified diagrammatical illustration of an automotive battery with a vertical positive contact slot at the left side of a battery housing, a vertical positive contact slot at the front of the battery housing, a vertical negative contact slot at the right side of the battery housing, and a negative contact slot at the front of the battery housing, in accordance with the present invention.

FIG. 16 is a simplified diagrammatical illustration of an exemplary embodiment of a battery 340 that enables electrical charging attachment from both the front and the sides of a battery housing 349. The battery 340 includes a battery cover 346 attached to a battery casing 348 with a battery cover flange seal 368. There are a positive battery terminal 342 and a negative battery terminal 344 in the battery cover 346. A positive front contact slot 352 provides an opening in the battery cover flange seal 368 and passes through a casing front face 364. A positive side contact slot 356 provides a second opening in the battery cover flange seal 368 and passes through a casing left-side face 362. The battery 340 also includes a negative front contact slot 354 on the casing front face 364, and a negative side contact slot 358 (hidden) on a casing right-side face 366.

Figure 17:
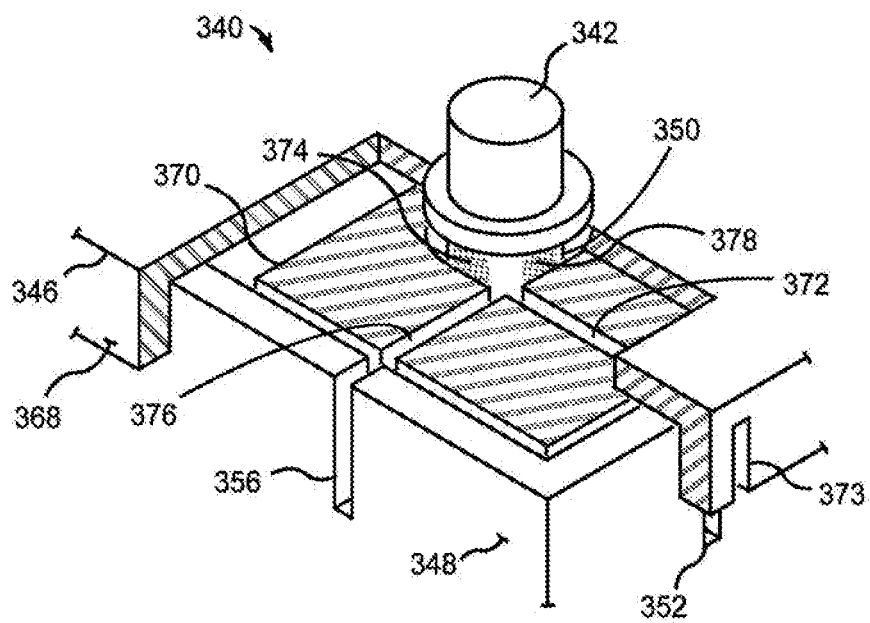
FIG. 17 is a cross-sectional detail cutaway view of the battery of FIG. 16 showing a positive battery terminal, the two positive contact slots, and a positive contact slot encasement.

FIG. 17 is a close-up, partial cutaway, detail view of a corner of the battery 340 showing the positive battery terminal 342, with a portion of the battery cover 346 removed to expose a positive battery post 350 and a positive contact slot encasement 370. The positive side contact slot 356 includes an encasement side channel 376 extending to a side slot positive post electrical contact region 378 on the positive battery post 350. The positive front contact slot 352 includes a positive contact slot flange notch 373 in the battery cover flange seal 368, with an encasement front channel 372 intersecting at an angle with the encasement side channel 376, and extending to a front slot positive post electrical contact region 374 on the positive battery post 350. A similar configuration of a negative contact slot encasement and contact slot encasement channels (not shown) extending from respective negative contact slots 354, 358 is provided at the negative battery terminal 344 (shown in FIG. 15).

Figure 18:
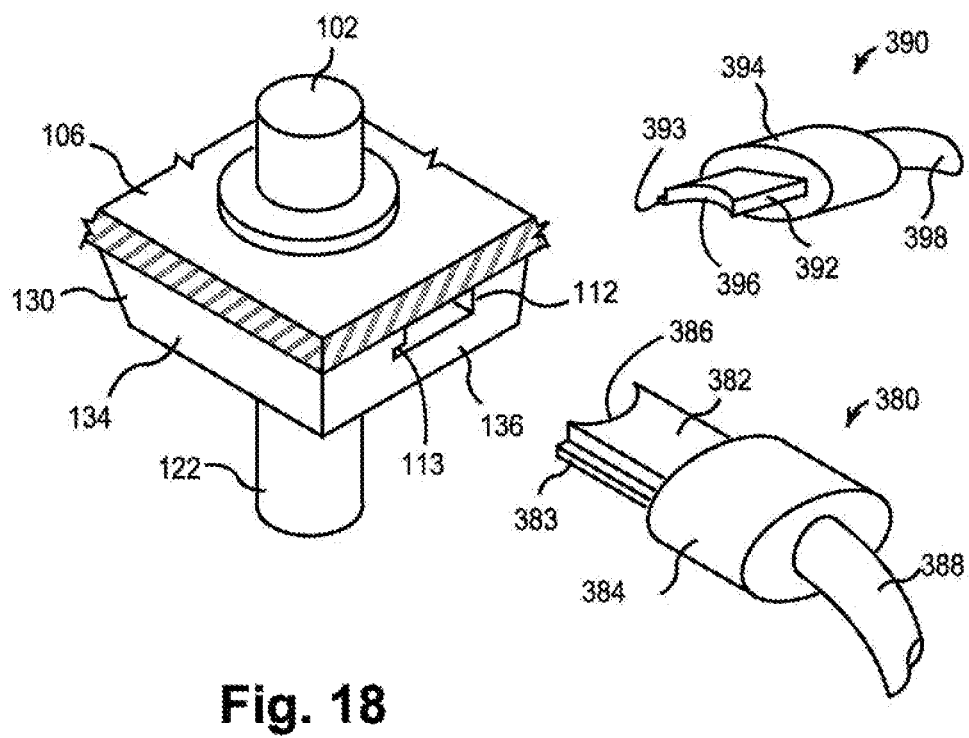
FIG. 18 is an isometric diagrammatical cutaway view of the positive battery terminal of FIG. 4 showing the configuration of the positive contact slot and a positive electrical plug positioned for insertion into the positive contact slot.

FIG. 18 is a detail diagrammatical illustration of the positive battery terminal 102, the battery cover 106, the positive contact slot encasement 130, and the positive battery post 122, as first shown above in FIGS. 4 and 5. The positive contact slot 112 is sized and configured to receive a positive electrical plug 380 that includes an electrically conductive positive electrical prong 382. The positive electrical prong 382 includes a longitudinal alignment ridge 383 that is configured for insertion into a corresponding positive alignment groove 113 in the positive contact slot 112. This feature prevents erroneous insertion of the positive electrical plug 380 into the negative contact slot 114 (shown in FIG. 4).

The positive electrical prong 382 also terminates in a leading concave contact edge 386 that is configured to provide maximum contact surface area and minimal electrical contact resistance when inserted against the positive post electrical contact region 128 (shown in FIG. 5). The positive electrical plug 380 further includes an insulated, high-amperage, electrical conductor 388, such as stranded copper wire, electrically connected to the positive electrical prong 382 inside an electrically insulative plug grip 384. The electrical conductor 388 is of sufficient cross-sectional area to safely conduct the electrical current levels normally associated with a battery charging or a jump-starting operation.

A negative electrical plug 390 includes an electrically conductive negative electrical prong 392 that is a mirror image of the positive electrical prong 382, and is thus configured for insertion into the negative contact slot 114 (shown in FIG. 4). An alignment ridge 393 on the negative electrical prong 392 prevents erroneous insertion of the negative electrical plug 390 into the positive contact slot 112. The negative electrical prong 392 terminates in a leading concave contact edge 396 which is configured to fit against the negative post electrical contact region 148 (shown in FIG. 6). The negative electrical plug 390 is connected to an insulated, high-amperage, electrical conductor 398 inside an electrically insulative plug grip 394.

Figure 19:
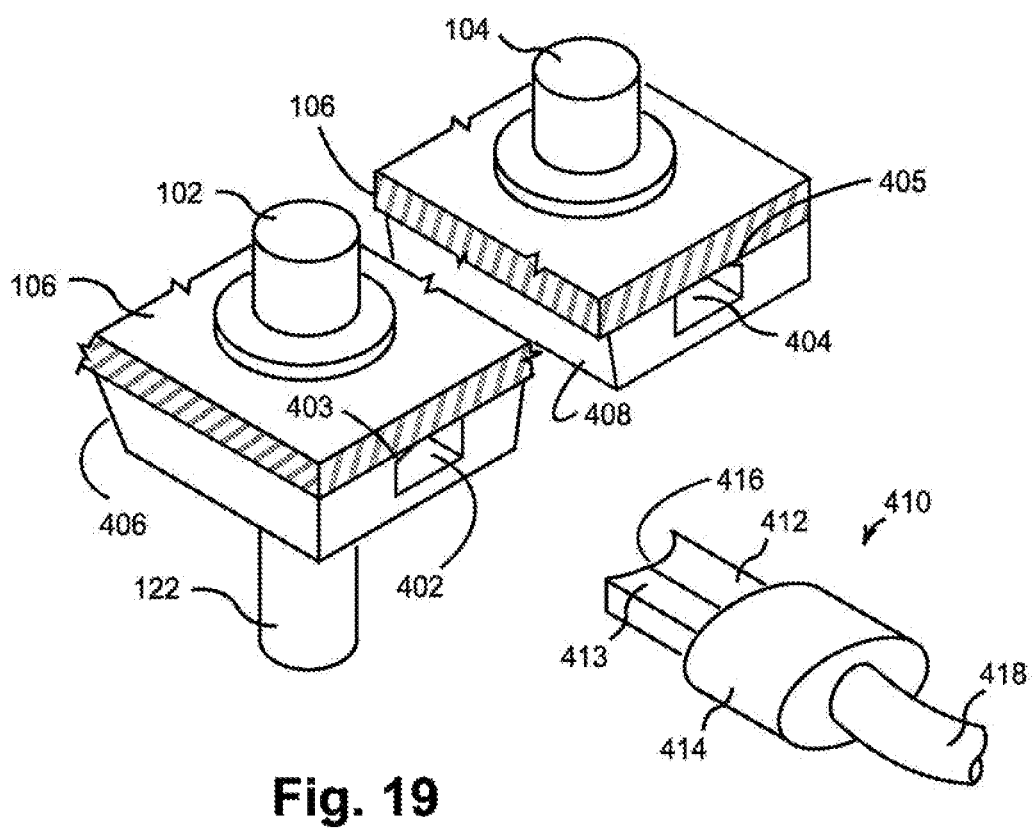
FIG. 19 is an isometric diagrammatical cutaway view of the battery terminals of FIG. 4 showing alternative positive and negative contact slot configurations, and a positive electrical plug positioned for insertion into the positive contact slot.

FIG. 19 is a simplified diagrammatical illustration of the positive battery terminal 102 and the negative battery terminal 104 on the battery cover 106, first seen in FIG. 4. In an alternative embodiment, the positive contact slot 112 is replaced by a positive contact slot 402 which has a substantially rectangular opening with a truncated upper left-hand corner 403. The negative contact slot 114 is replaced by a mirror-image negative contact slot 404 which has a substantially rectangular opening with a truncated upper right-hand corner 405.

A positive electrical plug 410 includes a positive electrical prong 412 configured for insertion only into the positive contact slot 402. An insulated electrical conductor 418 is connected to the positive electrical prong 412 inside a plug grip 414. A polarizing flat 413 on the positive electrical prong 412 provides clearance for the truncated upper left-hand corner 403, and allows a user to grasp the plug grip 414 and place a prong concave contact surface 416 against the positive battery post 122 enclosed within a positive contact slot encasement 406. A negative electrical plug (not shown), having a negative electrical prong that is a mirror image of the positive electrical prong 412, can be used for insertion only into the polarized negative contact slot 404 in a negative contact slot encasement 408.

Figure 20:
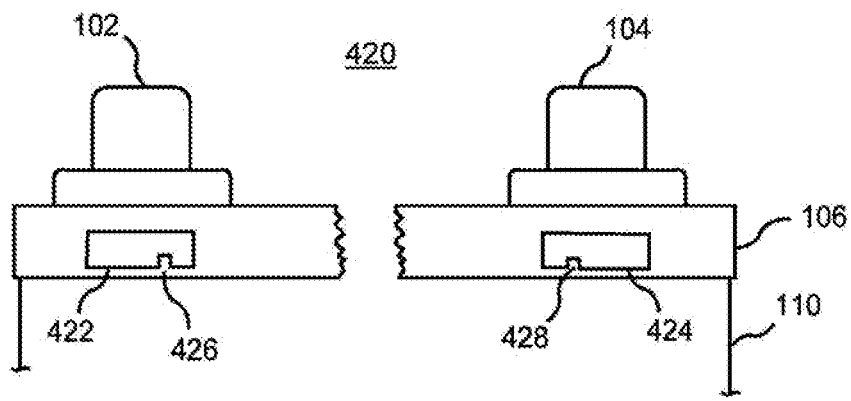
FIG. 20 is a diagrammatical view of alternative polarized positive and negative contact slots with perimeter ridges in a battery, in accordance with the present invention.

FIG. 20 is a simplified diagrammatical illustration of a portion of a battery 420 wherein electrical connection to the positive battery terminal 102 can be made through a substantially rectangular positive contact slot 422 that extends to the positive battery post (not shown). There is also a substantially rectangular negative contact slot 424 providing electrical contact access to the negative battery terminal 104 via a negative battery post (not shown). The positive contact slot 422 includes a perimeter ridge 426 functioning to prevent insertion of an incompatible electrical prong (not shown) that does not have a corresponding channel of a proper size and location. The negative contact slot 424 similarly includes a perimeter ridge 428 to prevent insertion of an incompatible electrical prong (not shown). The contact slots 422, 424 thus form a polarized contact slot pair.

Figure 21:
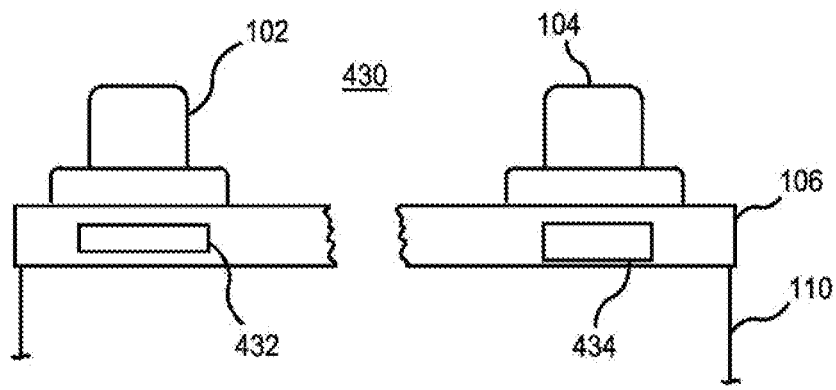
FIG. 21 is a diagrammatical view of alternative polarized positive and negative contact slots of different sizes in a battery, in accordance with the present invention.

FIG. 21 is a simplified diagrammatical illustration of a portion of a battery 430 wherein an electrical connection to the positive battery terminal 102 can be made through a substantially rectangular positive contact slot 432 that extends to the positive battery post (not shown). Similarly, electrical contact access to the negative battery terminal 104 can be made via a substantially rectangular negative contact slot 434 that extends to the negative battery post (not shown). As can be seen from the illustration, the dimensional width of the positive contact slot 432 is greater than that of the negative contact slot 434, and the height dimension of the negative contact slot 434 is greater than that of the positive contact slot 432, thus forming a polarized contact slot pair.

Figure 22:
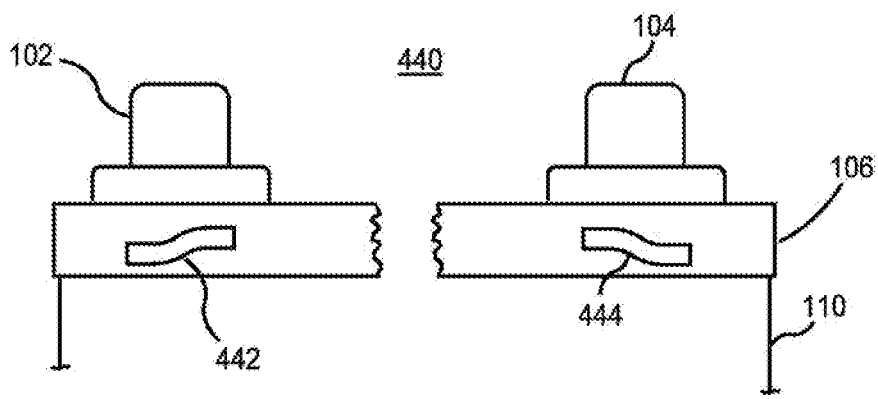
FIG. 22 is a diagrammatical view of alternative offset jog rectangular polarized positive and negative contact slots in a battery, in accordance with the present invention.

FIG. 22 is a simplified diagrammatical illustration of a portion of a battery 440 wherein an electrical connection can be made to the positive battery terminal 102 via an offset jog rectangular positive contact slot 442 extending through the battery cover 106 and the battery casing 110. Similarly, electrical contact access to the negative battery terminal 104 is provided by an offset jog rectangular negative contact slot 444. The positive contact slot 442 is a mirror image of the negative contact slot 444, to form a polarized contact slot pair.

Figure 23:
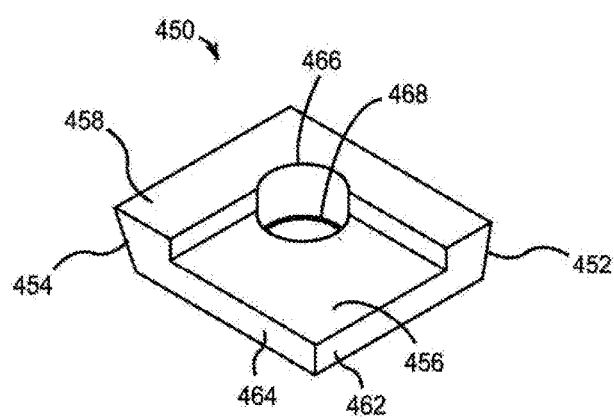
FIG. 23 is a simplified diagrammatical illustration of a contact slot encasement configuration for use in the automotive batteries of FIGS. 4 and 8.

FIG. 23 is a simplified diagrammatical illustration of a contact slot encasement 450 that can be used in place of either of the contact slot encasements 130, 140, shown in FIG. 6, and in place of either of the contact slot encasements 180, 190, shown in FIG. 9. The contact slot encasement 450 has a rectangular perimeter with a first encasement wall 452, a second encasement wall 454, and a prong support base 456. A battery post through hole 466 passes through the encasement walls 452, 454 and the prong support base 456. A base through hole opening 468 is sized and shaped to allow insertion of a battery post (not shown), while providing a leakproof fit around a battery post (not shown) to prevent the seepage of battery electrolyte solution onto the prong support base 456. The contact slot encasement 450 may be attached to the battery cover interior surface (not shown) by bonding a top surface 458 to the battery cover, or by applying an adhesive to the top surface 458. An electrolyte-resistant sealant (not shown) may be applied to a front surface 462 and to a side surface 464 to prevent seepage of battery electrolyte (not shown) onto the prong support base 456.

Figure 24:
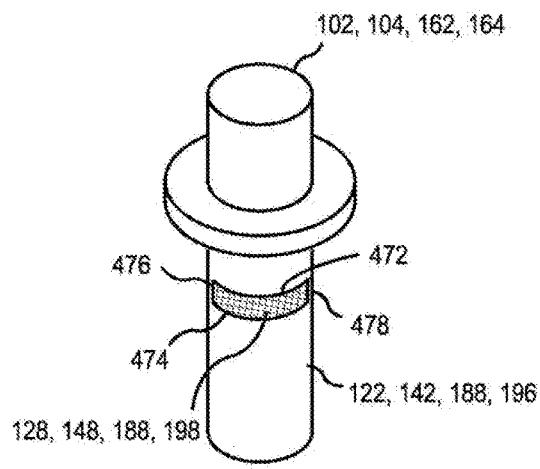
FIG. 24 is an isometric diagrammatical illustration of a battery post showing a lateral convex electrical contact region on the surface.

FIG. 24 is a simplified diagrammatical illustration of the battery terminals 102, 104, 162, 164 with respective battery posts 122, 142, 186, 196. When used with any of contact slot encasements 130, 140, 180, or 190 described above, a respective post electrical contact region 128, 148, 188, 198 is exposed as an electrical contact for a compatible electrical plug, such as the positive electrical plug 380 in FIG. 18 and the positive electrical plug 410 in FIG. 19. In FIG. 24, the positive post electrical contact region 128 is a nonplanar rectangle, or a curved band, bounded by a first circumferential arc 472, a second circumferential arc 474, a first longitudinal line segment 476, and a second longitudinal line segment 478. The positive post electrical contact region 128 interfaces with external electrical connectors such as the positive electrical plug 380 (shown in FIG. 18) and the positive electrical plug 410 (shown in FIG. 19). It should be understood that, although the positive electrical plug 380 has the prong concave contact surface 386, and the positive electrical plug 410 has the prong concave contact surface 416, contact surfaces of larger radii (not shown) can be used instead, under certain circumstances, but a greater contact resistance can result.

Figure 25:
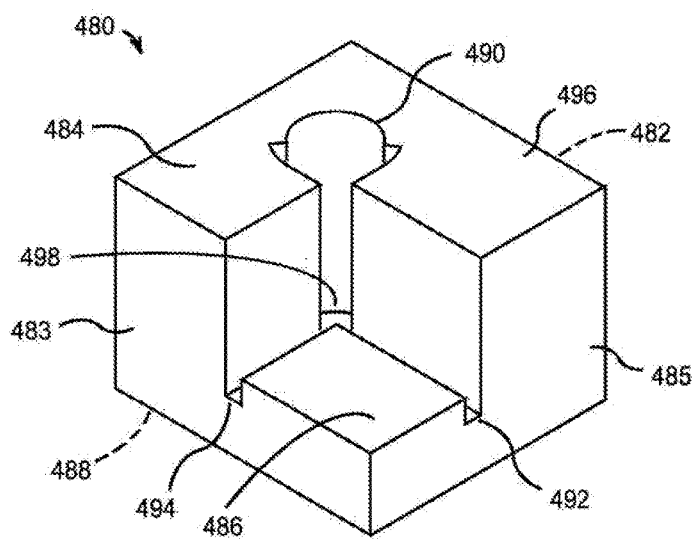
FIG. 25 is a simplified diagrammatical illustration of an alternative contact slot encasement for use in the battery of FIG. 16.

FIG. 25 is a simplified diagrammatical illustration of a contact slot encasement 480 configuration that can be used in place of either of the contact slot encasements 240, 260 shown in FIG. 12, the positive contact slot encasement 290 shown in FIG. 14, the positive contact slot encasement 310, shown in FIG. 15, and the positive contact slot encasement 370, shown in FIG. 17. The contact slot encasement 480 has a rectangular perimeter with a first encasement wall 482, a second encasement wall 484, and an encasement interior pad 486. A battery post through hole 490 passes through the encasement walls 482, 484 and through an encasement base surface 488. A base through hole opening 498 is sized and shaped to allow insertion of a battery post, while providing a leakproof fit around a battery post (not shown) to prevent the seepage of battery electrolyte solution into a first prong groove 492 or a second prong groove 494. The contact slot encasement 480 may be attached to a battery cover (not shown) by bonding an encasement top surface 496 to the battery cover interior surface, or by applying an adhesive (not shown) to the encasement top surface 496 for chemical bonding. An electrolyte-resistant sealant (not shown) may be applied to an encasement first side surface 483 and to an encasement second side surface 485 to prevent seepage of battery electrolyte (not shown) into the prong grooves 492, 494.

Figure 26:
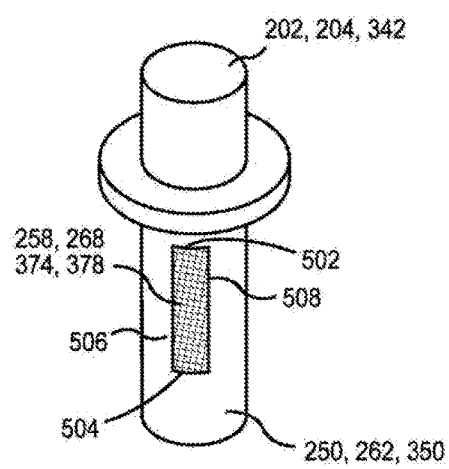
FIG. 26 is an isometric diagrammatical illustration of a battery post showing a longitudinal convex electrical contact region on the surface.

FIG. 26 shows the battery terminals 202, 204, 342 and the corresponding battery posts 250, 262, 350, as disclosed above. The electrical contact regions 258, 268, 374, 378 are nonplanar rectangles, or curved bands, bounded by a first circumferential arc 502, a second circumferential arc 504, a first longitudinal line segment 506, and a second longitudinal line segment 508. The electrical contact regions 258, 268, 374, 378 interface with external electrical connectors such as the electrical plugs 220, 230 in FIG. 10.

Figure 27:
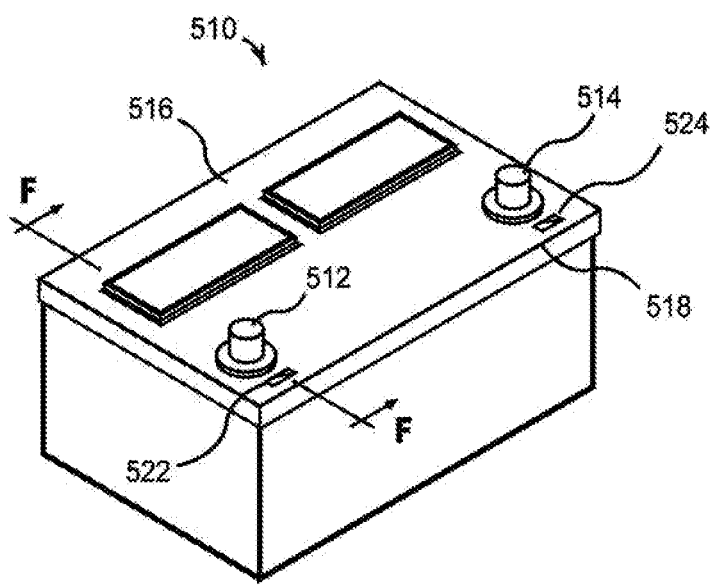
FIG. 27 is a simplified diagrammatical illustration of a battery with a positive contact slot and a negative contact slot in the top surface of a battery cover.

FIG. 27 is a simplified diagrammatical illustration of an exemplary embodiment of a battery 510 that enables electrical charging access in a battery cover 516. The battery 510 includes a positive battery terminal 512 and a negative battery terminal 514. A positive contact slot 522 in the battery cover 516, is located between the positive battery terminal 512 and a cover perimeter front edge 518, and provides a means of electrically connecting to the positive battery terminal 512. A negative contact slot 524 in the battery cover 516, is located between the negative battery terminal 514 and the cover perimeter front edge 518, and provides a means of electrically connecting to the negative battery terminal 514.

Figure 28:
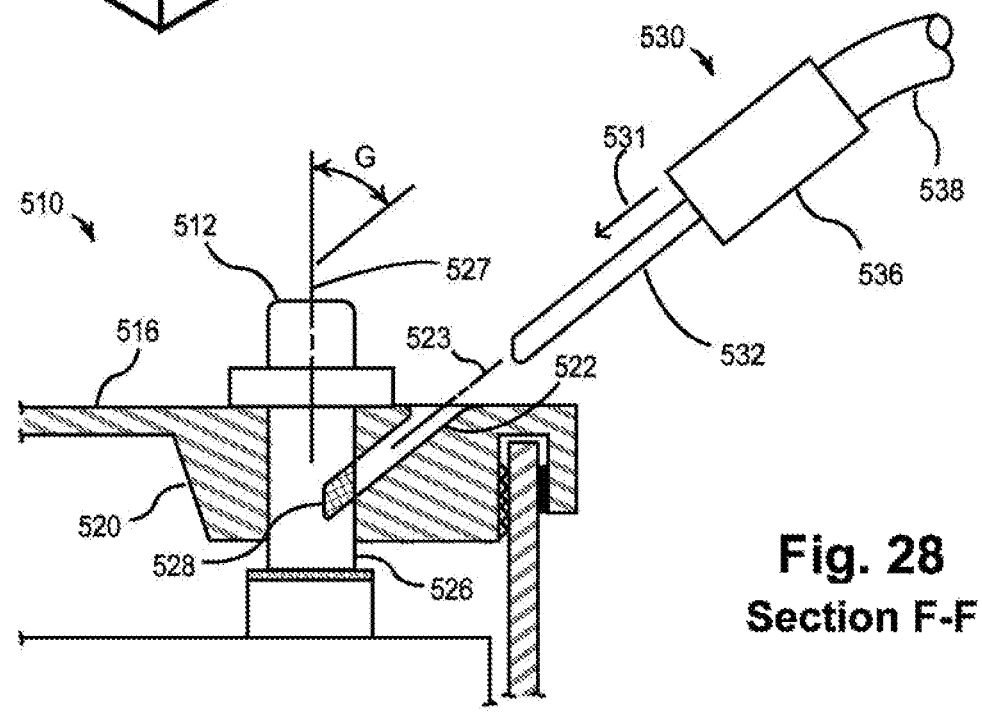
FIG. 28 is a cross-sectional view F-F of a positive battery post and the positive contact slot of the battery in FIG. 27, showing a positive electrical plug positioned for insertion into the positive contact slot.

FIG. 28 is a cross-sectional detail view F-F of the positive battery terminal 512 and the positive contact slot 522 of the battery 510, taken across the section plane F-F through the battery cover 516, as indicated in FIG. 27 except that, for clarity of illustration, the section plane F-F does not pass through the battery terminal 512, nor through a positive battery post 526. Note that a longitudinal axis 523 of the positive contact slot 522 forms an acute angle 'G' with a longitudinal axis 527 of the positive battery post 526. A positive contact slot encasement 520 encloses the positive contact slot 522 and part of the positive battery post 526.

Figure 29:
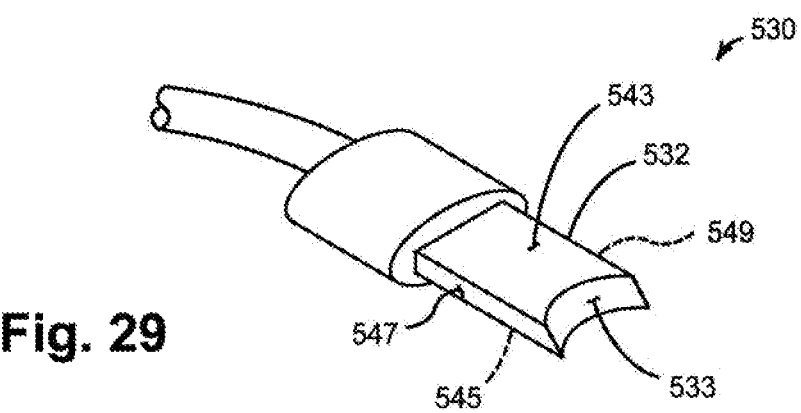
FIG. 29 is a detail isometric view of the positive electrical plug of FIG. 28 showing a substantially parallelepiped electrical prong with side edges, top and bottom rectangular surfaces, and a leading concave contact edge.

As can be appreciated by one skilled in the relevant art, the battery 510 can be charged, or can be used to electrically connect to another battery, by insertion of a positive electrical plug 530 having a slot-compatible positive electrical prong 532 into the positive contact slot 522, as indicated by an arrow 571. This action makes electrical contact with a convex positive post electrical contact region 528, which region is in the shape of a curved band on the positive battery post 526. The positive electrical prong 532 is electrically connected to an insulated electrical conductor 538 inside a non-conducting plug grip 536. It should be understood that all the electrical prongs disclosed in the present specification are substantially in the shape of a rectangular parallelepiped with one rectangular edge secured in a plug grip. As best seen in the detail view of the positive electrical plug 530 in FIG. 29, the electrical prong 532 includes a top surface 543, a bottom surface 545 (hidden), a right edge 547, and a left edge 549. The positive electrical prong 532 terminates in a leading oblique concave contact edge 533 for achieving maximum surface contact with the convex positive post electrical contact region 528, shown in FIG. 28. That is, the longitudinal length of the top surface 543 is smaller than the longitudinal length of the bottom surface 545.

Figure 30:
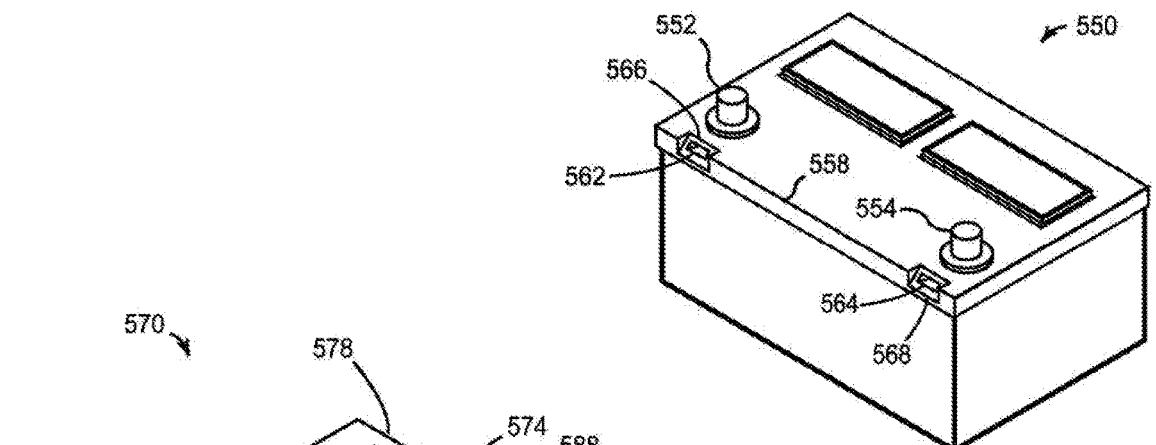
FIG. 30 is a simplified diagrammatical illustration of a battery with a positive contact slot and a negative contact slot in a perimeter front edge of a battery cover, in accordance with the present invention.

FIG. 30 is a simplified diagrammatical illustration of an exemplary embodiment of a battery 550, with a positive battery terminal 552 and a negative battery terminal 554, that enables electrical charging attachment on a battery cover front perimeter edge 558. The battery 550 includes a positive contact slot 562 in a positive recessed surface 566 that provides a means of electrically connecting to the positive battery terminal 552. A negative contact slot 564 in a negative recessed surface 568 provides a means of electrically connecting to the negative battery terminal 554.

Figure 31:
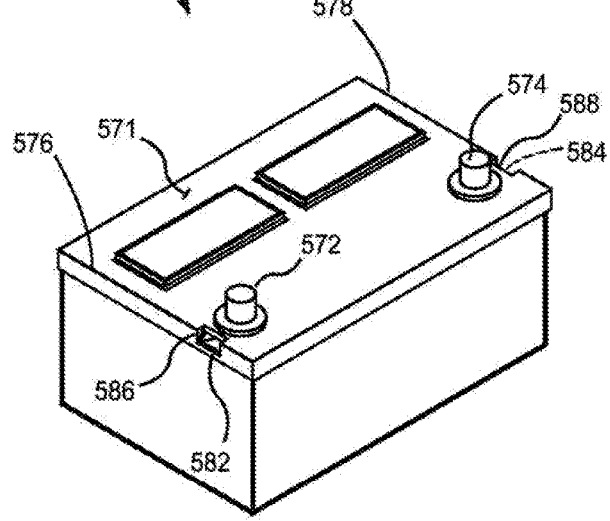
FIG. 31 is a simplified diagrammatical illustration of a battery with a positive contact slot in a perimeter left side edge and a negative contact slot in a perimeter right side edge of a battery cover, in accordance with the present invention.

FIG. 31 is a simplified diagrammatical illustration of an exemplary embodiment of a battery 570 that provides electrical charging attachments in a battery cover 571. A positive contact slot 582, in a positive recessed surface 586, is located in a cover left perimeter edge 576 to provide a means of electrically connecting to a positive battery terminal 572. A negative contact slot 584 (hidden), in a negative recessed surface 588, is located in a cover right perimeter edge 578 and provides a means of electrically connecting to a negative battery terminal 574.

Figure 32:
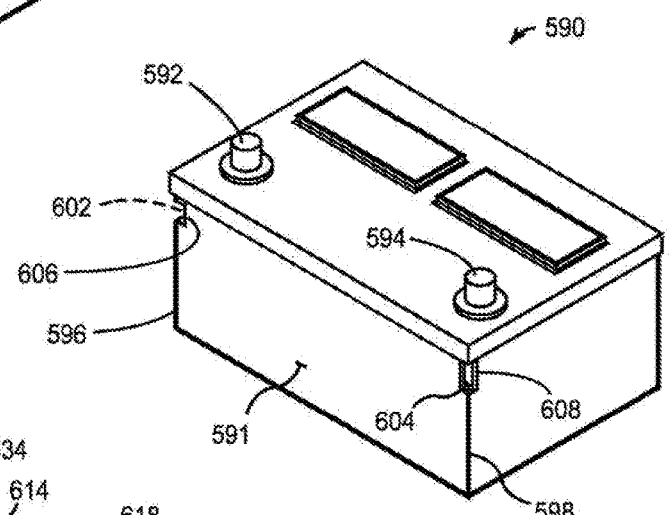
FIG. 32 is a simplified diagrammatical illustration of a battery with a positive contact slot in a left side edge and a negative contact slot in a right side edge of a battery casing, in accordance with the present invention.

FIG. 32 is a simplified diagrammatical illustration of an exemplary embodiment of a battery 590 that provides electrical charging attachments in a battery casing 591. A positive contact slot 602 (hidden), in a positive recessed surface 606, is located in a left casing corner 596 and provides a means of electrically connecting to a positive battery terminal 592. A negative contact slot 604 in a negative recessed surface 608, is located in a right casing corner 598 and provides a means of electrically connecting to a negative battery terminal 594.

Figure 33:
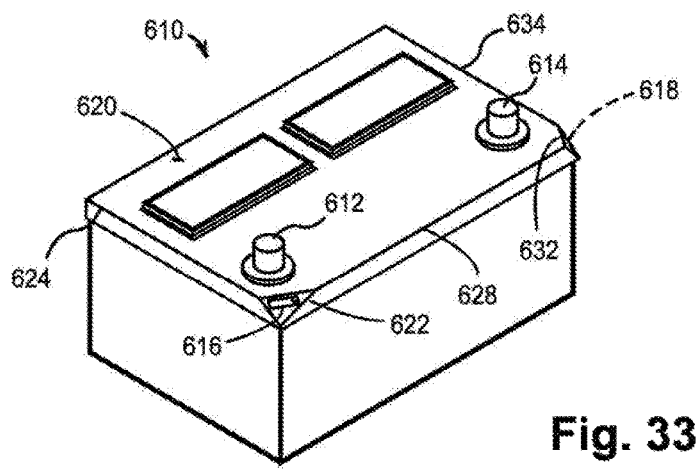
FIG. 33 is a simplified diagrammatical illustration of a battery with positive and negative contact slots at left and right front corners of a battery cover, in accordance with the present invention.

FIG. 33 is a simplified diagrammatical illustration of an exemplary embodiment of a battery 610 that provides electrical charging attachments on corners of a battery cover 620. In this configuration, a positive corner facet 622 is provided at the intersection of a cover perimeter left edge 624 and a cover perimeter front edge 628. A negative corner facet 632 is provided at the intersection of a cover perimeter right edge 634 and the cover perimeter front edge 628. A positive contact slot 616 in the positive corner facet 622 provides a means of electrically connecting to a positive battery terminal 612. A negative contact slot 618 (hidden) in the negative corner facet 632 provides a means of electrically connecting to a negative battery terminal 614.

Figure 34:
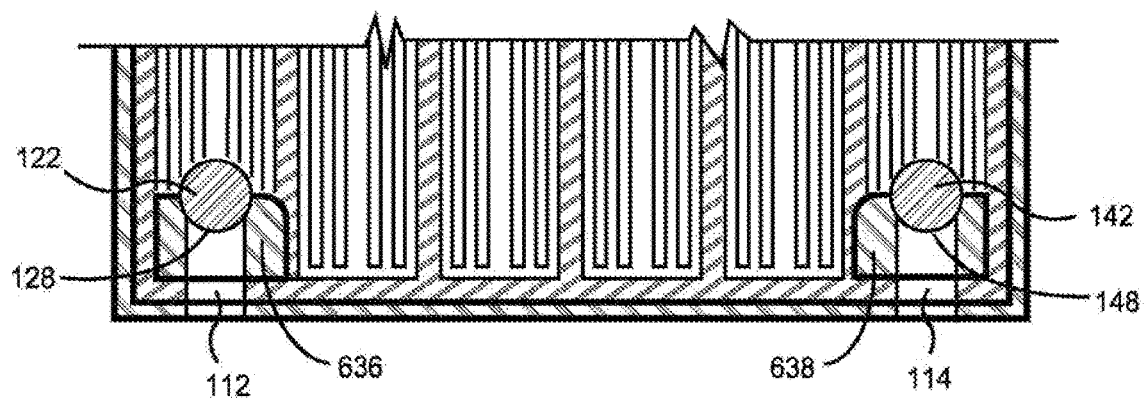
FIG. 34 is a cross-sectional plan view of the battery of FIG. 6 showing alternative contact slot encasements.

FIG. 34 is an alternate cross-section A-A plan view of an exemplary embodiment of the battery 100 of FIG. 6 showing an alternative contact slot encasement configuration. In this configuration, the positive contact slot 112 and the positive post electrical contact region 128 are enclosed in a positive contact slot encasement 636, wherein the positive contact slot encasement 636 covers about half the circumference of the positive battery post 122. Similarly, the negative contact slot 114 and the negative post electrical contact region 148 are enclosed in a negative contact slot encasement 638, wherein the negative contact slot encasement 638 covers about half the circumference of the negative battery post 142.

Figure 35:
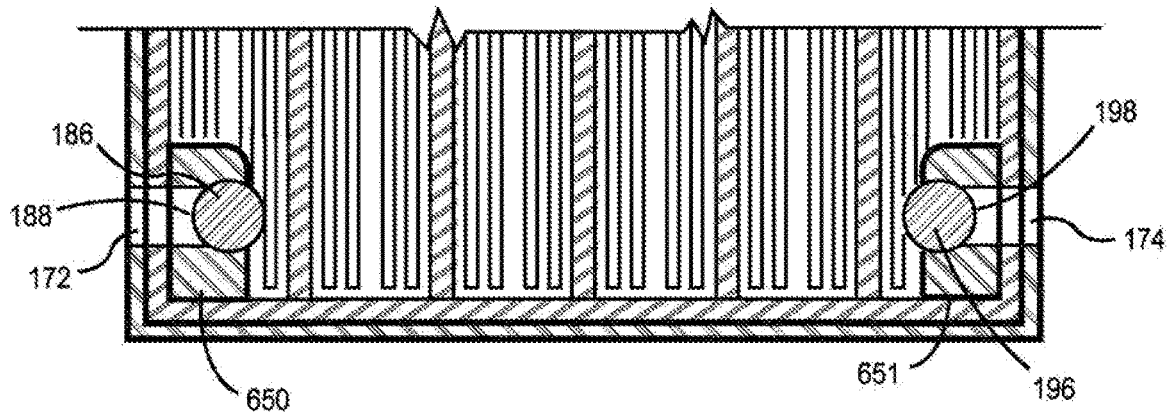
FIG. 35 is a cross-sectional plan view of the battery of FIG. 9 showing alternative contact slot encasements.

It can be appreciated by one skilled in the relevant art that the above-disclosed configurations of contact slot encasements covering respective battery posts over their entire circumferences provides can for minimal leakage of battery electrolyte solution. However, innovative battery manufacturing methods of sealing component interfaces may provide for minimal leakage of electrolyte solution even if less than the entire circumference of a battery post is covered. FIG. 35 is an alternate cross-section C-C plan view of an exemplary embodiment of the battery 160 of FIG. 9 showing an alternative contact slot encasement configuration. In this configuration, the positive contact slot 172 and the positive post electrical contact region 188 are enclosed in a positive contact slot encasement 650, wherein the positive contact slot encasement 650 covers more than half the circumference of the positive battery post 186. Similarly, the negative contact slot 174 and the negative post electrical contact region 198 are enclosed in a negative contact slot encasement 651, wherein the negative contact slot encasement 651 covers more than half the circumference of the negative battery post 198.

Figure 36:
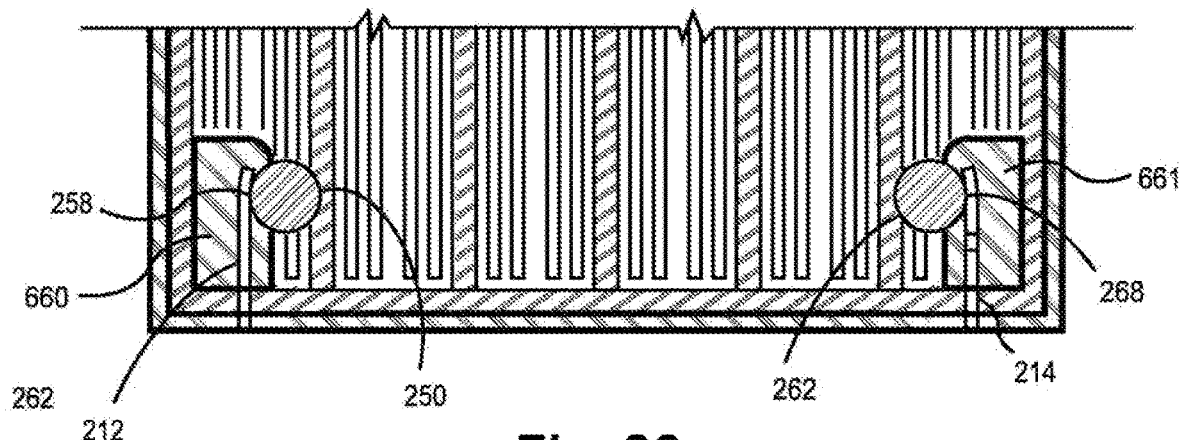
FIG. 36 is a cross-sectional plan view of the battery of FIG. 12 showing alternative contact slot encasements.

FIG. 36 is an alternate cross-section D-D plan view of an exemplary embodiment of the battery 200 of FIG. 12 showing an alternative contact slot encasement configuration. In this configuration, the positive contact slot 212 and the positive post electrical contact region 258 are enclosed in a positive contact slot encasement 660, wherein the positive contact slot encasement 660 covers less than half the circumference of the positive battery post 250. Similarly, the negative contact slot 214 and the negative post electrical contact region 268 are enclosed in a negative contact slot encasement 661, wherein the negative contact slot encasement 661 covers less than half the circumference of the negative battery post 262.

But wait, there is more. FIG. 37 is a simplified diagrammatical illustration of a battery 640 having a positive battery side terminal 642 and a negative battery side terminal 644 located on a battery casing front surface 646 of a battery casing 648. A positive top electrical plug 662 can be inserted into a positive top contact slot 652 to make electrical contact with the positive battery side terminal 642. The positive top electrical plug 662 includes a positive top electrical prong 664, with a positive top prong leading edge concave contact surface 666, connected to an insulated electrical conductor 668. Similarly, a negative top electrical plug 656 can be inserted into a negative top contact slot 654 to make electrical contact with the negative battery side terminal 644. The top contact slots 652, 654 are located in a battery cover 658.

In an exemplary embodiment, a positive side contact slot 672 may be provided in a battery casing left-side surface 676, and a negative side contact slot 674 (hidden) may be provided in a battery casing right-side surface 678 (hidden). A positive side electrical plug 682 can be inserted into the positive side contact slot 672, and a negative side electrical plug 684 can be inserted into the negative side contact slot 674. The positive side electrical plug 682 includes a positive side electrical prong 686, with a positive side prong leading edge concave contact surface 688, connected to an insulated electrical conductor 689. The negative side electrical plug 684 is similarly configured. It should be understood that the battery 640 need include only one of the positive contact slots 652, 672 and only one of the negative contact slots 654, 674 when the battery 640 is manufactured. Alternatively, each of the contact slots 652, 654, 672, 674 may be covered by a knock-out tab (not shown) that can be removed by a user after the battery 640 has been installed in an engine compartment.

FIG. 38 is a close-up, partial cutaway, detail view of the positive battery side terminal 642 connected to a positive battery post 692 on the battery casing 648. Part of a positive contact slot encasement 690 has been removed to expose the partially enclosed positive battery post 692. The particular method by which the positive battery post 692 is attached to a positive plate strap (not shown) lying below the positive contact slot encasement 690, can vary from manufacturer to manufacturer and is not shown, for clarity of illustration. The positive side electrical plug 682 is shown as partially inserted through the positive side contact slot 672 in the battery casing left-side surface 676.

The positive top electrical prong 664 is electrically connected to the insulated electrical conductor 668 inside a top positive plug grip 667. The positive top prong leading edge concave contact surface 666 has the same radius of curvature as does the outer surface of the positive battery post 692. Accordingly, the positive top electrical plug 662 can be used to make electrical contact with a positive top slot electrical contact region 694 on the positive battery post 692 by full insertion into the positive top contact slot 652 (shown in FIG. 34). Similarly, the positive side prong leading edge concave contact surface 688 (also shown in FIG. 34) on the positive side electric prong 686 has the same radius of curvature as does the outer surface of the positive battery post 692. Accordingly, the positive side electrical plug 682 can be used to make electrical contact with a positive side slot electrical contact region 696.

FIG. 39 shows the positive battery post 692 and the positive battery side terminal 642 in greater detail. The positive top slot electrical contact region 694 is a nonplanar rectangle, or a curved band, on the convex cylindrical surface of the positive battery post 692, bounded by a first circumferential arc 702, a second circumferential arc 704, a first longitudinal line segment 706, and a second longitudinal line segment 708. The positive top slot electrical contact region 694 interfaces with external electrical connectors such as the top electrical plugs 662, 656 shown in FIG. 34.

FIG. 40 is a simplified diagrammatical illustration of an exemplary embodiment of a battery 710 that enables electrical charging attachment at both the top and the sides of a battery casing 711, in accordance with the present invention. A positive top contact slot 716 provides an opening in a battery cover 722, and a positive side contact slot 717 provides an opening in a battery casing left-side surface 726. The positive contact slots 716, 717 provide alternate modes of electrically contacting a positive battery side terminal 712. The battery 710 also includes a negative top contact slot 718 in the battery cover 722, and a negative side contact slot 719 (hidden) in a battery casing right-side surface 728 (hidden). The negative contact slots 718, 719 provide alternate modes of electrically contacting a negative battery side terminal 714.

A positive top electrical plug 736 can be inserted into the positive top contact slot 716, or a positive side electrical plug 737 can be inserted into the positive side contact slot 717, to make electrical contact with the positive battery side terminal 712. A negative top electrical plug 738 can be inserted into the negative top contact slot 718, or a negative side electrical plug 739 can be inserted into a negative side contact slot 719 (hidden), to make electrical contact with the negative battery side terminal 714. It should be understood that the battery 710 needs to include only positive contact slot 716 or 717, and only negative contact slot 718 or 719, to enable a charging operation. Accordingly, each of the contact slots 716, 717, 718, 719 may be covered by a knock-out tab (not shown) that can be removed by a user after the battery 710 has been installed in an engine compartment.

FIG. 41 is a close-up, partial cutaway, detail view of a portion of the battery casing left-side surface 726 and the positive battery side terminal 712, which is connected to a positive battery post 740 partially secured in a positive contact slot encasement 730. Part of the positive contact slot encasement 730 has been removed to more clearly show part of the positive battery post 740. The particular method of attaching the positive battery post 740 to a positive plate strap (not shown), lying below the positive contact slot encasement 730, varies from manufacturer to manufacturer and is not shown, for clarity of illustration.

The positive top electrical plug 736 includes a positive top electrical prong 742 with a positive top plug contact surface 744 (hidden) that makes electrical contact with a positive top slot electrical contact region 746 on the positive battery post 740 when fully inserted into the positive top contact slot 716 (shown in FIG. 37). The positive side electrical plug 737 includes a positive side electrical prong 743 with a positive side plug contact surface 745 (hidden) that makes electrical contact with a positive side slot electrical contact region 747 on the positive battery post 740 when fully inserted into the positive side contact slot 717 in the battery casing left-side surface 726. It should be noted that the electrical prongs 742, 743 need not be as thick as the electrical prongs 664, 686 shown in FIG. 35. It can be appreciated by one skilled in the art that, because the electrical prongs 664, 686 make electrical contact at respective prong leading edge concave contact surfaces 666, 688, the thicker configuration results in smaller contact resistance at the respective electrical contact regions 746, 747.

FIG. 42 shows the positive battery post 740 and the positive battery side terminal 712. The positive top slot electrical contact region 746 is a nonplanar rectangle, or a curved band, on a convex surface bounded by a first circumferential arc 752, a second circumferential arc 754, a first longitudinal line segment 756, and a second longitudinal line segment 758. The positive top slot electrical contact region 746 interfaces with external electrical connectors such as the positive top electrical plug 736, in FIG. 38.

Figure 43:
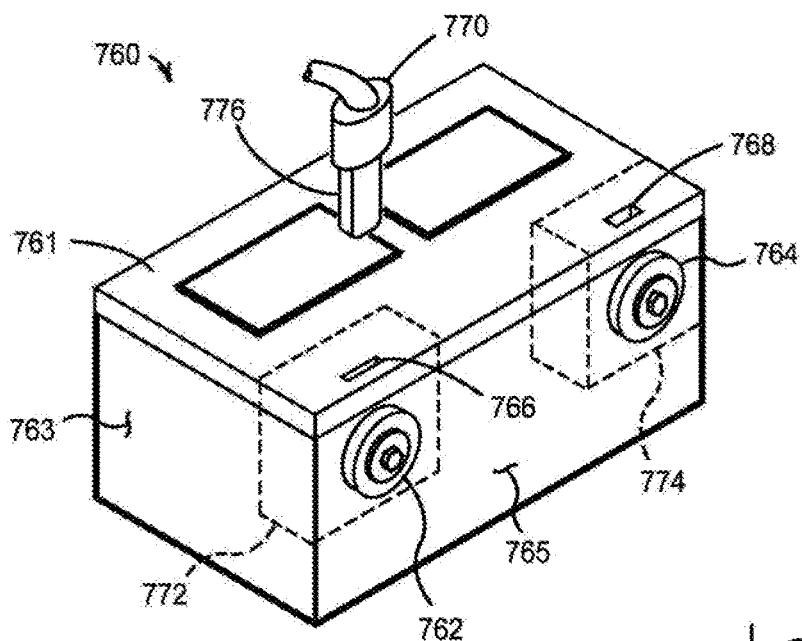
FIG. 43 is a simplified diagrammatical illustration of a side-terminal battery with a positive contact slot and a negative contact slot in the top surface of a battery cover, in accordance with the present invention.

FIG. 43 is a simplified diagrammatical illustration of an exemplary embodiment of a battery 760 that provides electrical charging attachments in a battery cover 761. The battery 760 has a positive battery side terminal 762 and a negative battery side terminal 764 in a battery casing front surface 765. A positive electrical contact slot 766 extends into a positive slot encasement 772 and a negative electrical contact slot 768 extends into a negative slot encasement 774, both slot encasements 772, 774 attached to a battery casing 763 to prevent leakage of battery electrolyte solution (not shown) into the contact slots 766, 768. A positive electrical plug 770 has a positive electrical prong 776 that is configured for insertion only into the positive electrical contact slot 766 and the positive slot encasement 772, by which action an electrical connection can be made to the positive battery side terminal 762. The negative electrical contact slot 768 and the negative slot encasement 774 are similarly configured for insertion of only a negative electrical plug (not shown).

Figure 44:
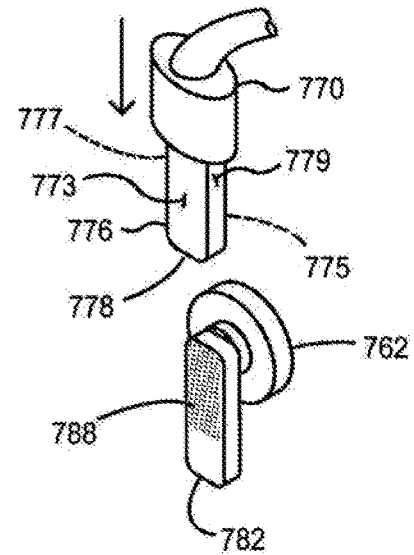
FIG. 44 is an isometric diagrammatical illustration of an electrical prong positioned to make electrical contact with a positive battery post in the battery of FIG. 40.

As seen in FIG. 44, the positive battery side terminal 762 is connected to a positive battery post 782 which is, in turn, electrically connected to an internal positive battery plate (not shown). The illustration shows relative positions of the positive electrical plug 770 and the positive battery side terminal 762 as the positive electrical plug 770 is being inserted into the positive electrical contact slot 766 (shown in FIG. 40). The positive electrical prong 776 includes a prong top surface 773, a prong contact surface 775 (hidden), a prong right edge 777, and a prong left edge 779. The positive electrical prong 776 terminates in a prong leading edge 778. When the positive electrical plug 770 is fully inserted into the positive electrical contact slot 766, the prong contact surface 775 makes electrical contact with a positive post electrical contact region 788 on the positive battery post 782.

Figure 45:
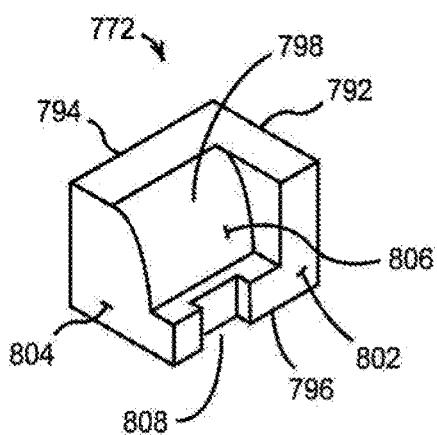
FIG. 45 is an isometric diagrammatical illustration of a slot encasement configured for use in the automotive battery of FIG. 40.

FIG. 45 illustrates an exemplary embodiment of the positive slot encasement 772 which includes an encasement side wall 792, an encasement back wall 794, and an encasement base 796 defining an encasement cavity 798. The encasement back wall 794 includes a cavity convex surface 806 inside the positive slot encasement 772. The encasement base 796 includes a base notch 808 to provide clearance for the positive battery post 782 (shown in FIG. 44). A front encasement surface 802 and a side encasement surface 804 are attached to the inside of the battery casing 763 (shown in FIG. 43). As the positive electrical plug 770 is inserted into the encasement cavity 798, the prong top surface 773 (shown in FIG. 44) engages the cavity convex surface 806, whereby the prong bottom surface 775 is urged against the positive post electrical contact region 788 (both shown in FIG. 44). The negative slot encasement 774 is similarly configured, as substantially a mirror image of the positive slot encasement 772.

Figure 46:
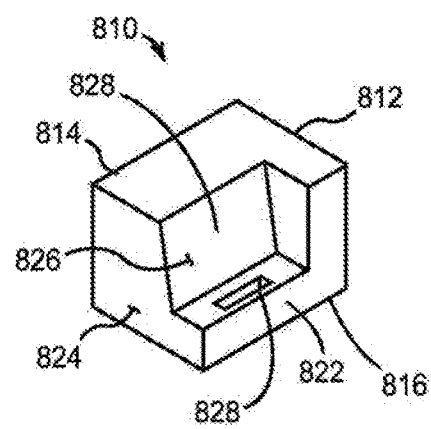
FIG. 46 is an isometric diagrammatical illustration of an alternative slot encasement configured for use in the automotive battery of FIG. 40.

FIG. 46 is an exemplary embodiment of an alternative positive slot encasement 810 that may be used in the battery 760 in place of the positive slot encasement 772. The positive slot encasement 810 includes an encasement side wall 812, an encasement back wall 814, and an encasement base 816 defining an encasement cavity 818. An encasement front surface 822 and an encasement side surface 824 are attached to the inside of the battery casing 763 (shown in FIG. 43) to prevent seepage of internal battery electrolyte solution (not shown) into the encasement cavity 818. The encasement back wall 814 includes a cavity sloping surface 826 for engaging the prong leading edge 778 on the positive electrical prong 776 (both shown in FIG. 44), and the encasement base 816 includes a base through slot 828 that allows the positive battery post 782 (not shown) to pass through the encasement base 816.

Figure 47:
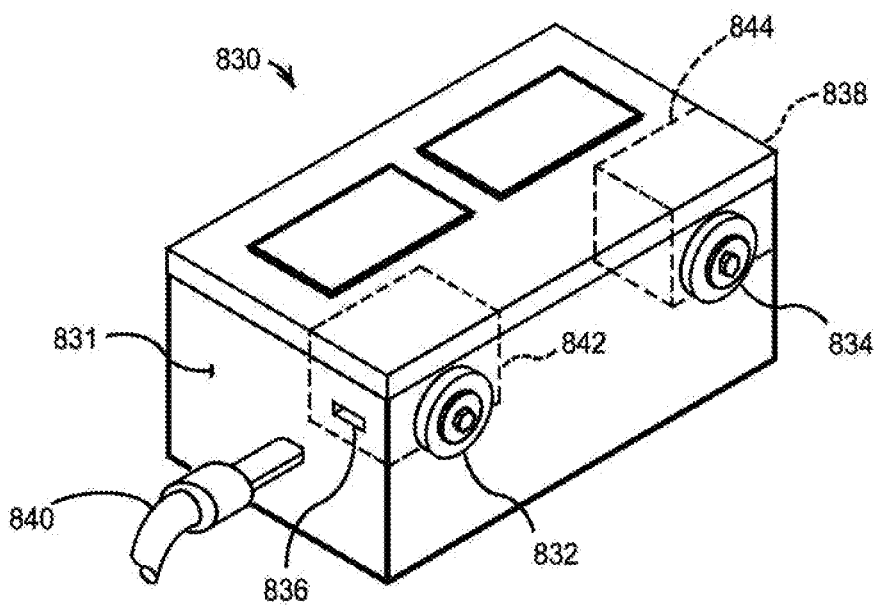
FIG. 47 is a simplified diagrammatical illustration of a side-terminal battery with a positive contact slot in a left side of a battery casing and a negative contact slot in a right side of the battery casing, in accordance with the present invention.

FIG. 47 is a simplified diagrammatical illustration of an exemplary embodiment of a battery 830 that enables electrical charging attachment in a battery casing 831. A positive electrical contact slot 836 extends into a positive slot encasement 842 and a negative electrical contact slot 838 (hidden) extends into a negative slot encasement 844. A positive electrical plug 840 is configured for insertion into only the positive electrical contact slot 836 and the positive slot encasement 842, by which action an electrical connection can be made to a positive battery side terminal 832. The negative electrical contact slot 838 and the negative slot encasement 844 (a mirror image of positive slot encasement 842) are similarly configured for insertion of a negative electrical plug (not shown) to electrically engage a negative battery side terminal 834.

Figure 48:
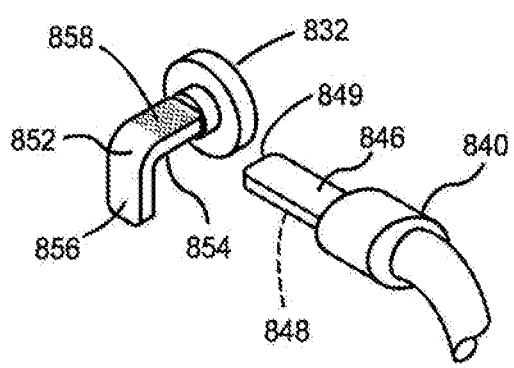
FIG. 48 is an isometric diagrammatical illustration of an electrical prong positioned to make electrical contact with a positive battery post in the automotive battery of FIG. 44.

As seen in FIG. 48 the positive battery side terminal 832 is connected to an angular positive battery post 852 which has a post transition section 854 extending into the battery 830 (shown in FIG. 47) and a post depending leg 856 that extends to and is electrically connected to a positive battery plate (not shown) disposed below the positive slot encasement 842 (shown in FIG. 47). The illustration shows relative positions of the positive electrical plug 840 and the positive battery side terminal 832 as the positive electrical plug 840 is being inserted into the positive electrical contact slot 836 (shown in FIG. 47). When the positive electrical plug 840 is fully inserted into the positive electrical contact slot 836, a prong contact surface 848 (hidden) on a positive electrical prong 846 makes electrical contact with a positive post electrical contact region 858 on the post transition section 854.

Figure 49:
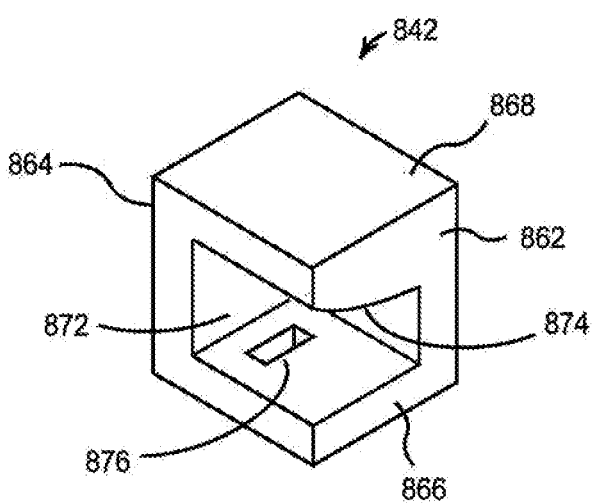
FIG. 49 is an isometric diagrammatical illustration of a contact slot encasement configured for use in the automotive battery of FIG. 44.

FIG. 49 illustrates an exemplary embodiment of the positive slot encasement 842 which is configured for use with the positive battery post 852 (shown in FIG. 48). The positive slot encasement 842 includes an encasement side wall 862, an encasement back wall 864, an encasement base 866, and an encasement top 868 defining an encasement cavity 872. The encasement top 868 includes a cavity convex surface 874 inside the positive slot encasement 842, and a through slot 876 to allow the post depending leg 856 (shown in FIG. 48) to contact the positive battery plate (not shown). With additional reference to FIG. 48, as the positive electrical plug 840 is inserted into the encasement cavity 872, a leading edge 849 on the positive electrical prong 846 engages the cavity convex surface 874, whereby the prong contact surface 848 is urged against the positive post electrical contact region 858. The negative slot encasement 844 is similarly configured, but is substantially a mirror image of the positive slot encasement 842.

Figure 50:
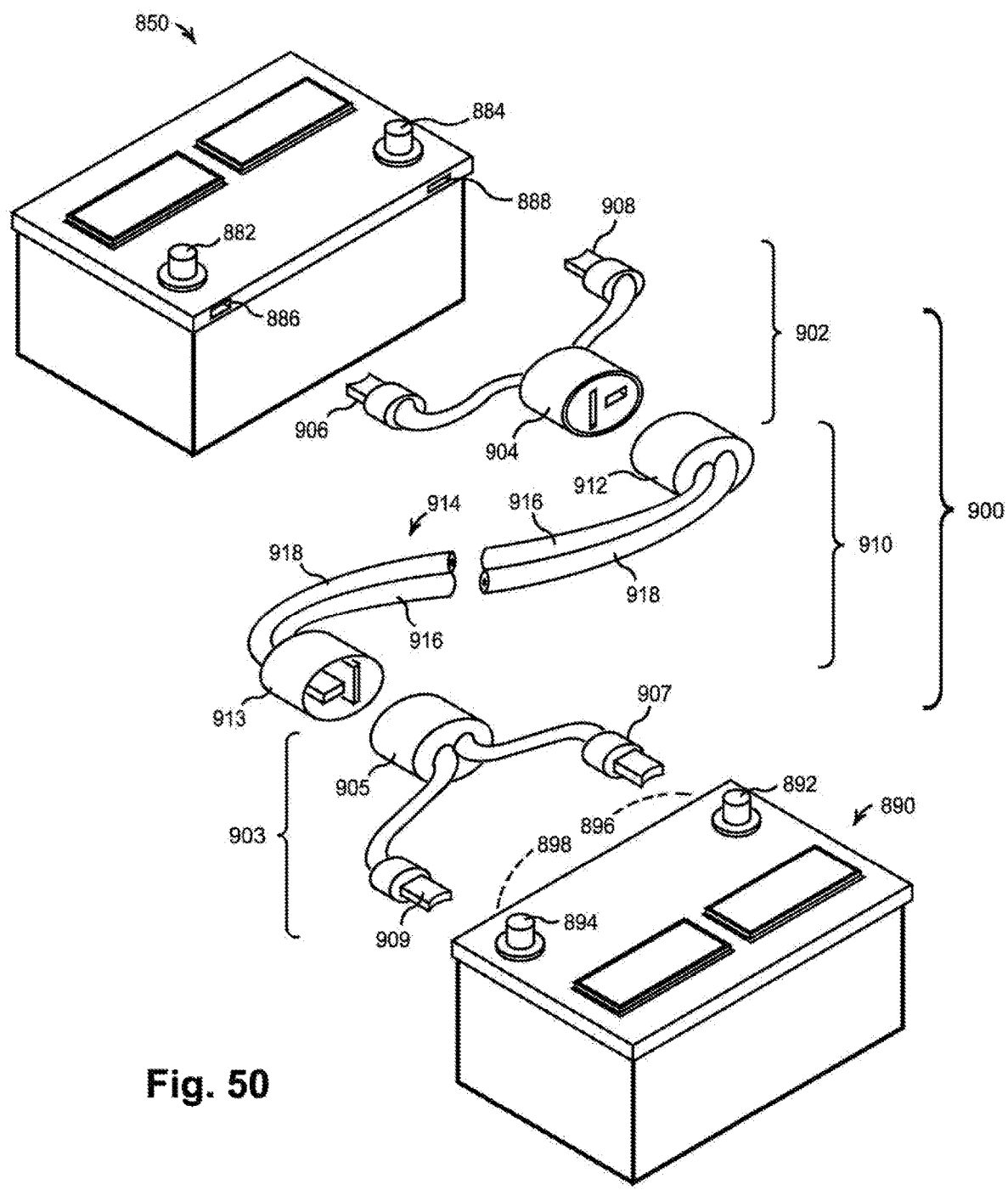
FIG. 50 is an isometric diagrammatical illustration of a setup for charging a battery, in which a source battery and a drained battery have the same contact slot configurations, showing a source battery connection adapter, a drained battery connection adapter, and an adapter connection cable, in accordance with the present invention.

FIG. 50 illustrates a typical application of the present invention in the process of charging of a battery, or in the jump-starting of a vehicle, in which a source battery 880 and a drained battery 890 have the same contact slot configurations. This charging situation may occur, for example, when both vehicles are made by the same manufacturer. The source battery 880 includes a positive contact slot 886 for electrically connecting to a positive battery terminal 882, and a negative contact slot 888 for electrically connecting to a negative battery terminal 884. The drained battery 890 includes a positive contact slot 896 (hidden) for electrically connecting to a positive battery terminal 892, and a negative contact slot 898 (hidden) for electrically connecting to a negative battery terminal 894. It should be understood that, to prevent inadvertent errors in connection, the opening size and shape of the positive contact slot 886 is different from the opening size and shape of the negative contact slot 888, and the opening size and shape of the positive contact slot 896 is different from the opening size and shape of the negative contact slot 898.

A battery interconnection cable assembly 900 is used to electrically connect the source battery 880 to the drained battery 890, as shown. The battery interconnection cable assembly 900 includes a source battery connection adapter 902 used at the source battery 880, a drained battery connection adapter 903 used at the drained battery 890, and an adapter connection cable 910 used to interconnect the battery connection adapters 902, 903. The source battery connection adapter 902 is electrically connected to the source battery 880 by inserting a positive source electrical plug 906 into the positive contact slot 886 and a negative source electrical plug 908 into the negative contact slot 888. The drained battery connection adapter 903 is electrically connected to the drained battery 890 by inserting a positive drained electrical plug 907 into the positive contact slot 896 and a negative drained electrical plug 909 into the negative contact slot 898.

The adapter connection cable 910 includes a source polarized plug 912 and a drained polarized plug 913 at opposite ends of a cable conductor pair 914 that includes a positive insulated conductor 916 and a negative insulated conductor 918. Preferably, the cable conductor pair 914 is approximately three to six meters in length to enable electrically connecting batteries in adjacent vehicles. The electrical connection between the source battery 880 and the drained battery 890 may be completed by inserting the source polarized plug 912 into a source polarized receptacle 904 on the source battery connection adapter 902 and by inserting the drained polarized plug 913 into a drained polarized receptacle 905 on the drained battery connection adapter 903. In an exemplary embodiment, the polarized plugs 912, 913 may be interchangeable so that the adapter connection cable 910 is reversible end-for-end. In the charging operation shown in FIG. 50, the driver of the vehicle with the source battery 880 may typically provide the source battery connection adapter 902 and the adapter connection cable 910. The driver of the vehicle with the drained battery 890 may typically provide the drained battery connection adapter 903 and may also have his own adapter connection cable 910.

It should be understood that the source battery 880 may include contact slots of a size and shape other than those shown for the positive contact slot 886 and the negative contact slot 888. For example, any of the positive contact slot 112 shown in FIG. 4, the positive contact slot 172 shown in FIG. 8, the positive contact slot 212 shown in FIG. 10, the positive contact slot 402 shown in FIG. 19, or the positive contact slot 422 shown in FIG. 20, can be used in place of the positive contact slot 886 in FIG. 50. Accordingly, the negative contact slot 888 and the electrical plugs 906, 908 would be replaced by a polarized negative contact slot and electrical plugs of compatible configurations.

Figure 51:
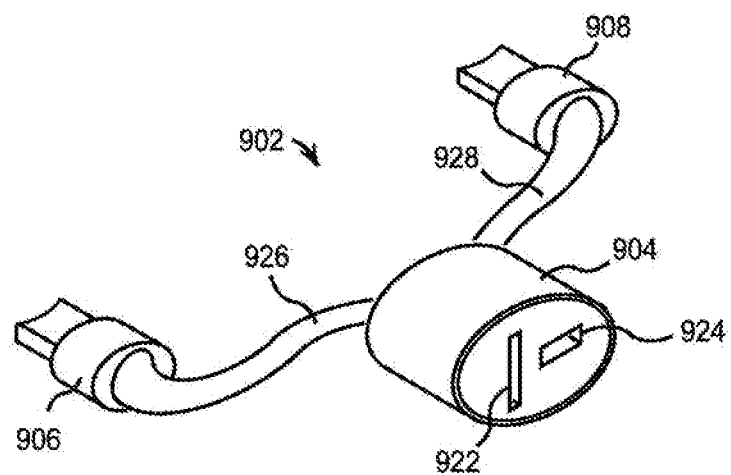
FIG. 51 is a detail view of the source battery connection adapter of FIG. 47.

FIG. 51 is a detailed view of the source battery connection adapter 902. The source polarized receptacle 904 is a nonconductive enclosure that includes a positive electrical socket 922 connected to the positive source electrical plug 906 by a positive insulated conductor 926, and a negative electrical socket 924 connected to the negative source electrical plug 908 by a negative insulated conductor 928. It can be appreciated that the positive source electrical plug 906 and the negative source electrical plug 908 are noninterchangeable such that the positive source electrical plug 906 cannot be inserted into the negative contact slot 888, and the negative source electrical plug 908 cannot be inserted into the positive contact slot 886, shown in FIG. 50.

Figure 52:
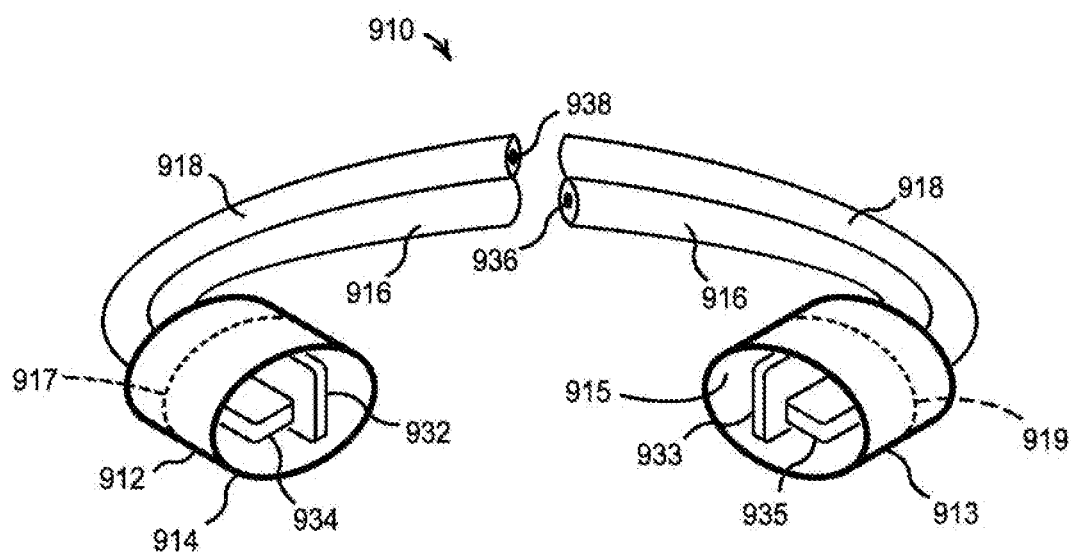
FIG. 52 is a detail view of the adapter connection cable of FIG. 47.

FIG. 52 is a simplified detail illustration of the adapter connection cable 910 showing that the source polarized plug 912 includes a positive electrical prong 932 electrically connected to a positive electrical prong 933 in the drained polarized plug 913 by the positive insulated conductor 916, and that a negative electrical prong 934 is electrically connected to a negative electrical prong 935 in the drained polarized plug 913 by the negative insulated conductor 918. The polarized plugs 912, 913 include respective flexible, nonconductive hoods 914, 915 that can be folded back to fold lines 917, 919 if desired to allow insertion of the electrical prongs 932, 933, 934, 935 into the polarized receptacles 904, 905 (shown in FIG. 50), or into alternatively configured receptacles (not shown). The positive insulated conductor 916 includes a positive electrical conductor 936, and the negative insulated conductor 918 includes a negative electrical conductor 938. Each of the electrical conductors 936, 938 has a sufficient cross-sectional area, (e.g., preferably four gauge to zero gauge), to safely conduct high amperage engine starter current.

Figure 53:
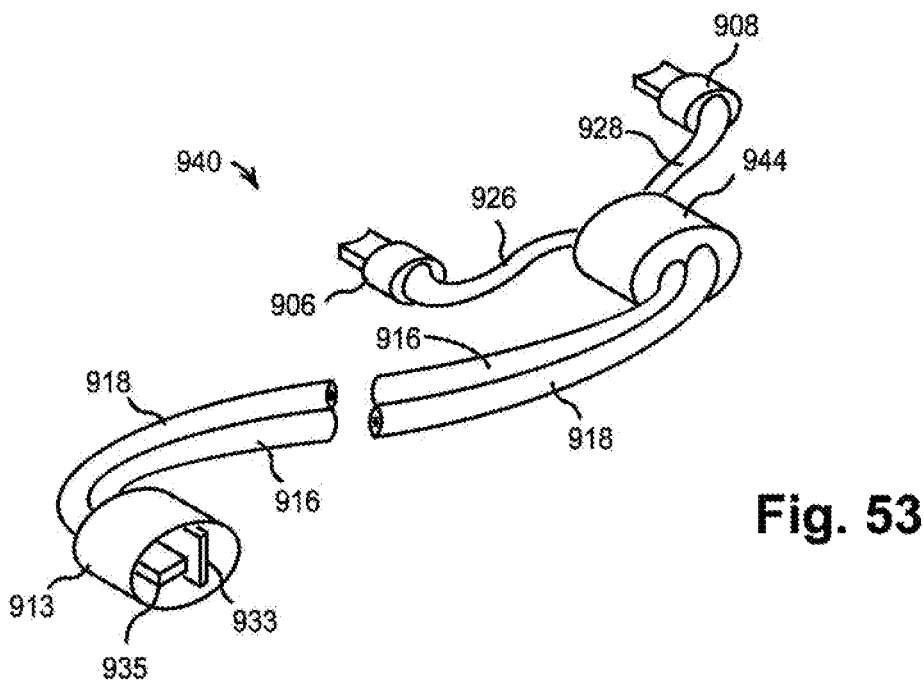
FIG. 53 a detail view of a battery adapter cable that can be used in place of the source battery connection adapter and the adapter connection cable of FIG. 47.

FIG. 53 shows a battery adapter cable 940 that can be used in place of both the source battery connection adapter 902 and the adapter connection cable 910 to perform the battery charging operation shown in FIG. 50. Referring to FIG. 53, the battery adapter cable 940 includes the positive source electrical plug 906, which is electrically connected to the positive insulated conductor 926, to the positive insulated conductor 916, and to the positive electrical prong 933 in the drained polarized plug 913. The battery adapter cable 940 also includes the negative source electrical plug 908, which is electrically connected to the negative insulated conductor 928 to the negative insulated conductor 918, and to the negative electrical prong 935 in the drained polarized plug 913. Inside a nonconductive electrical junction casing 944, the positive insulated conductor 926 is electrically connected to the positive insulated conductor 916, and the negative insulated conductor 928 is electrically connected to the negative insulated conductor 918.

Figure 54:
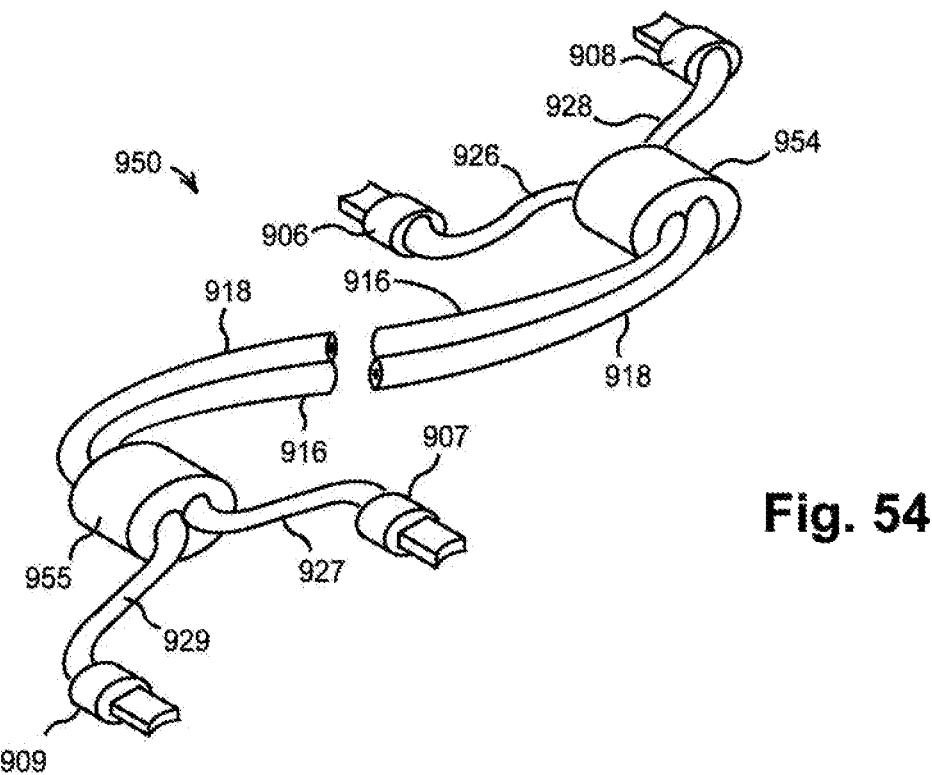
FIG. 54 a detail view of a battery interconnection cable that can be used in place of both battery connection adapters and the adapter connection cable of FIG. 47.

FIG. 54 shows a battery interconnection cable 950 that can be used in place of the battery interconnection cable assembly 900 shown in FIG. 50. Referring to FIG. 54, the battery interconnection cable 950 includes the positive source electrical plug 906, which is electrically connected to the positive insulated conductor 926, to the positive insulated conductor 916, to the positive insulated conductor 927, and to the positive drained electrical plug 907. The battery interconnection cable 950 also includes the negative source electrical plug 908, which is electrically connected to the negative insulated conductor 928, to the negative insulated conductor 918 to the negative insulated conductor 929, and to the negative drained electrical plug 909. The positive insulated conductor 926 is electrically connected to the positive insulated conductor 916, and the negative insulated conductor 928 is electrically connected to the negative insulated conductor 918, inside an electrical junction casing 954. The positive insulated conductor 916 is electrically connected to the positive insulated conductor 927 and the negative insulated conductor 918 is electrically connected to the negative insulated conductor 929, inside an electrical junction casing 955.

Figure 55:
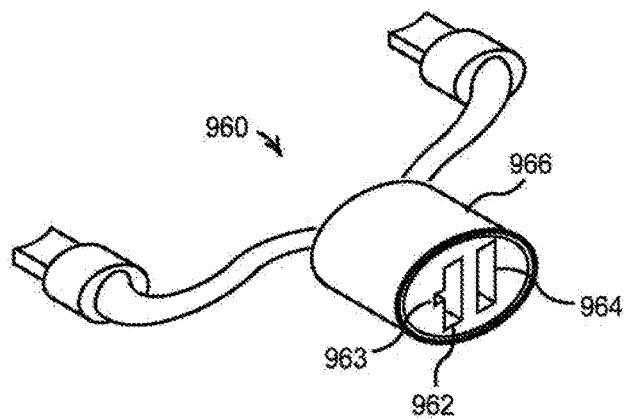
FIG. 55 is a detail view of a battery connection adapter having a positive electrical socket with a perimeter groove, in accordance with the present invention.
Figure 56:
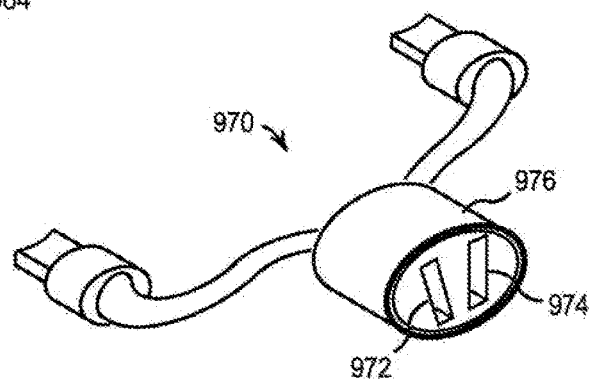
FIG. 56 is a detail view of a battery connection adapter with a positive electrical socket oriented at an angle to a negative electrical socket, in accordance with the present invention.
Figure 57:
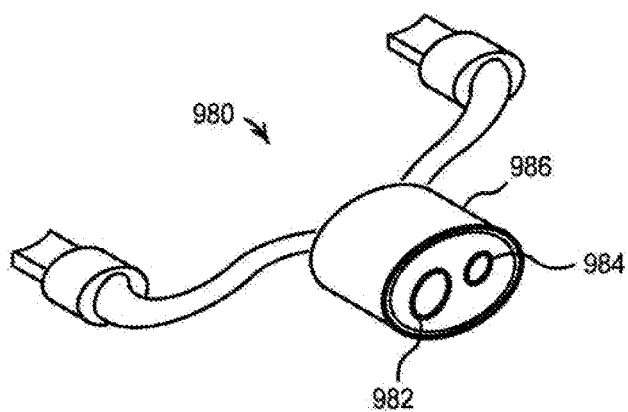
FIG. 57 is a detail view of a battery connection adapter with a round positive electrical socket and a round negative electrical socket, in accordance with the present invention.
Figure 58:
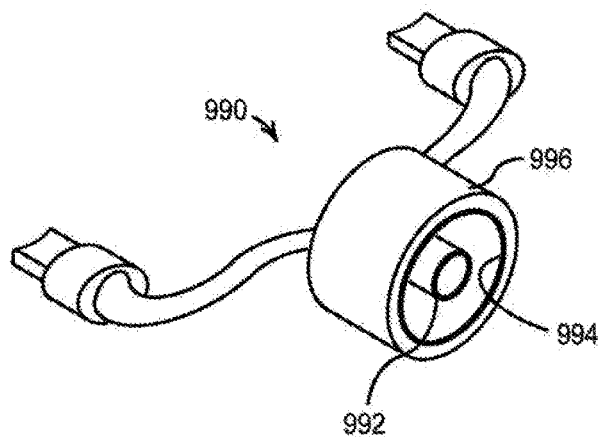
FIG. 58 is a detail view of a coaxial battery connection adapter including a central conductive positive sleeve and an outer conductive negative cylindrical shell, in accordance with the present invention.

The particular configurations of the polarized plugs and the polarized sockets used in mating an adapter connection cable with battery connection adapters can be similar to any one of many polarized configurations widely used in the relevant art. For example, a battery connection adapter 960 may use a polarized receptacle 966 having a positive electrical socket 962 with a groove 963 and a negative electrical socket 964 without a groove, as shown in FIG. 55. A battery connection adapter 970 may use a polarized receptacle 976 having a positive electrical socket 972 oriented at an angle, i.e., not parallel, relative to a negative electrical socket 974, as shown in FIG. 56. A battery connection adapter 980 may use a polarized receptacle 986 having a round positive electrical socket 982 and a smaller round negative electrical socket 984, as shown in FIG. 57. A battery connection adapter 990 may use a coaxial polarized receptacle 996 having a central conductive positive sleeve 992 and an outer conductive negative cylindrical shell 994, as shown in FIG. 58.

A can be appreciated by one skilled in the art, a polarized plug (not shown) used in an adapter connection cable for attachment to any of the polarized receptacles 966, 976, and 986 would include appropriately configured positive and negative electrical prongs in a plug housing such that the positive electrical prong fits into the positive electrical socket and the negative electrical prong fits into the negative electrical socket. A polarized plug (not shown) used in an adapter connection cable for attachment to the coaxial polarized receptacle 996 would have a central conductive pin configured for contact insertion into the central conductive positive sleeve 992, and a larger cylindrical conductor configured for frictional fit inside the negative cylindrical shell 994.

Figure 59:
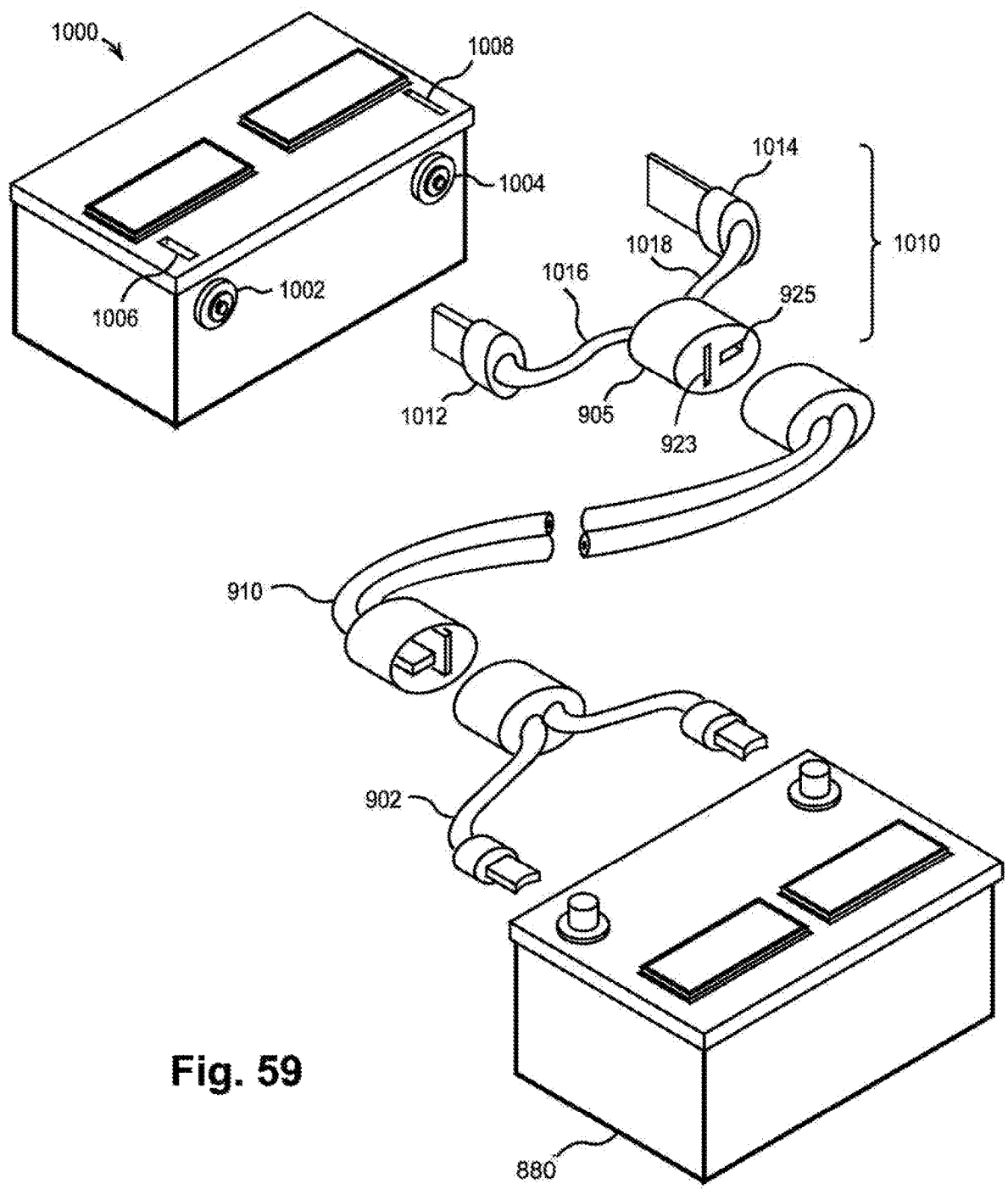
FIG. 59 is an isometric diagrammatical illustration of a setup for charging a battery, in which a source battery and a drained battery have different contact slot configurations, in accordance with the present invention.

FIG. 59 illustrates a typical application of the present invention in the process of charging of a battery, or in the jump-starting of a vehicle, in which the source battery 880 and a drained battery 1000 have different contact slot configurations. This charging situation may occur, for example, when the vehicles are made by different manufacturers. In the example shown, the drained battery 1000 includes a positive battery side terminal 1002 and a negative battery side terminal 1004. Electrical connections to the battery side terminals 1002, 1004 are provided by a positive contact slot 1006 and a negative contact slot 1008, respectively. A drained battery connection adapter 1010 is used with the adapter connection cable 910 and the source battery connection adapter 902 to electrically connect the source battery 880 to the drained battery 1000.

The drained battery connection adapter 1010 includes the drained polarized receptacle 905 with a positive electrical socket 923 connected to a positive drained electrical plug 1012 by a positive insulated conductor 1016, and a negative electrical socket 925 connected to a negative drained electrical plug 1014 by a negative insulated conductor 1018. The positive drained electrical plug 1012 and the negative drained electrical plug 1014 are noninterchangeable such that the positive drained electrical plug 1012 cannot be inserted into the negative contact slot 1008, and the negative drained electrical plug 1014 cannot be inserted into the positive contact slot 1006. In an exemplary embodiment, the battery adapter cable 940, shown in FIG. 53, can be used in place of the source battery connection adapter 902 and the adapter connection cable 910. In the charging operation shown in FIG. 59, the driver of the vehicle with the source battery 880 may typically provide the source battery connection adapter 902 and the adapter connection cable 910. The driver of the vehicle with the drained battery 1000 may typically provide the drained battery connection adapter 1010 and may also have his own adapter connection cable 910.

Figure 60:
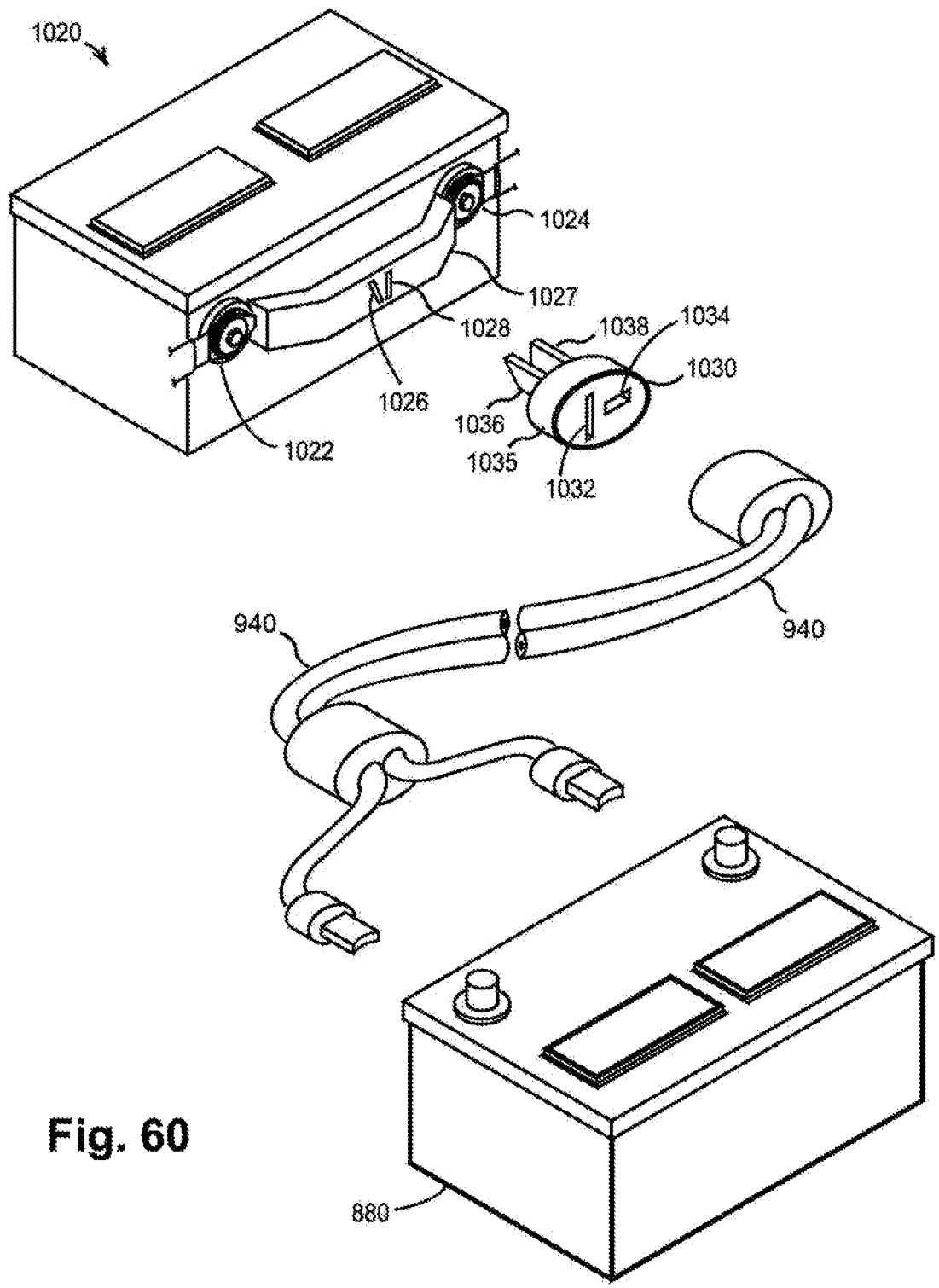
FIG. 60 is an isometric diagrammatical illustration of a setup for charging a battery, in which a drained battery includes a battery side mount clamp, in accordance with the present invention.

FIG. 60 illustrates another typical application of the present invention in the process of charging of a battery, or in the jump-starting of a vehicle, in which a drained battery 1020 has a positive battery side terminal 1022 and a negative battery side terminal 1024, but no contact slots. In the example shown, a user has installed on the drained battery 1020 a battery side mount clamp 1027 that includes a positive contact slot 1026 electrically connected to the positive battery side terminal 1022, and a negative contact slot 1028 electrically connected to the negative battery side terminal 1024. Various embodiments of the battery side mount clamp 1027 are disclosed in U.S. Pat. No. 10,862,231 incorporated by reference herein in its entirety. The source battery 880 is electrically connected to the drained battery 1020 with a battery side mount clamp connection adapter 1030 and the battery adapter cable 940.

The battery side mount clamp connection adapter 1030 includes a positive electrical socket 1032 electrically connected to a positive electrical prong 1036, and a negative electrical socket 1034 electrically connected to a negative electrical prong 1038. Electrical connections are disposed inside a nonconductive connection adapter grip 1035. The electrical sockets 1032, 1034 are sized and shaped so as to enable insertion therein of the respective electrical prongs 933, 935 in the battery adapter cable 940, shown in FIG. 50. In the charging operation shown in FIG. 60, the driver of the vehicle with the source battery 880 may typically provide the battery adapter cable 940. The driver of the vehicle with the drained battery 1020 may typically provide the battery side mount clamp connection adapter 1030.

Figure 61:
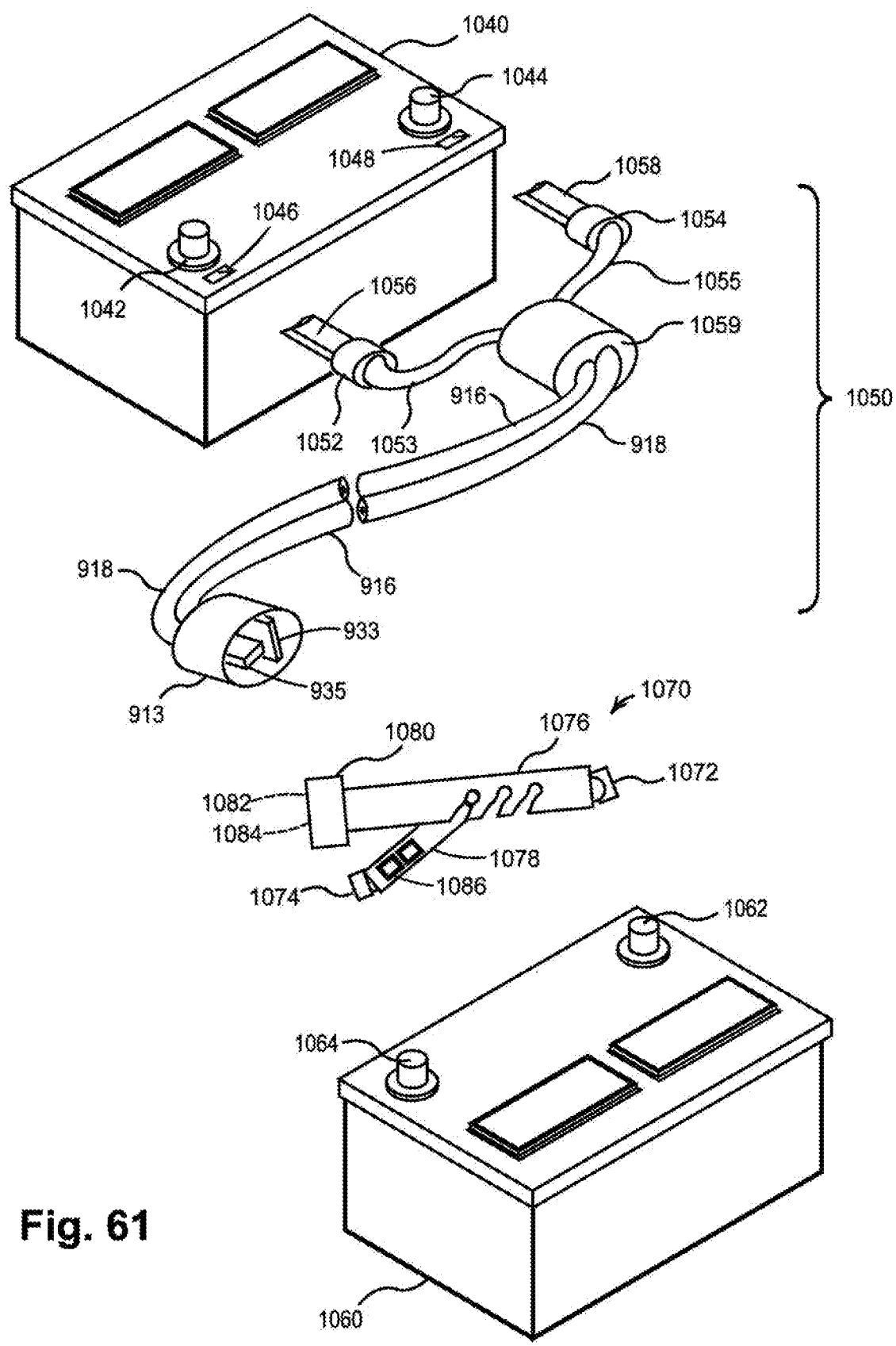
FIG. 61 is an isometric diagrammatical illustration of a setup for charging a battery, in which a drained battery has no contact slots, showing a battery connection adapter with a polarized battery clamp, in accordance with the present invention.

FIG. 61 illustrates an exemplary application of the present invention in the process of charging of a battery, or in the jump-starting of a vehicle, in which a drained battery 1060 has a positive battery terminal 1062, a negative battery terminal 1064, but no contact slots. In this charging configuration, a polarized battery clamp 1070 may be used to electrically access the drained battery 1060. The polarized battery clamp 1070 is disclosed in U.S. Pat. No. 9,815,378, incorporated by reference herein in its entirety. In an alternative embodiment, a compact battery clamp (not shown) disclosed in U.S. Pat. No. 9,178,292, also incorporated by reference herein in its entirety, can be used in place of the polarized battery clamp 1070.

A source battery 1040 with a positive battery post 1042 and a negative battery post 1044 may be electrically connected to the polarized battery clamp 1070 on the drained battery 1060 using a source battery connection adapter cable 1050. The source battery connection adapter cable 1050 includes: (i) the drained polarized plug 913, (ii) the insulated conductors 916, 918, (iii) a positive source electrical plug 1052 with a positive electrical prong 1056 electrically connected to a positive insulated conductor 1053, and (iv) a negative electrical plug 1054 with a negative electrical prong 1058 electrically connected to a negative insulated conductor 1055. Inside a nonconductive electrical junction casing 1059, the positive insulated conductor 1053 is electrically connected to the positive insulated conductor 916, and the negative insulated conductor 1055 is electrically connected to the negative insulated conductor 918. As described above, in the drained polarized plug 913, the positive insulated conductor 916 is electrically connected to the positive electrical prong 933 and the negative insulated conductor 918 is electrically connected to the negative electrical prong 935. The drained polarized plug 913 is provided in the source battery connection adapter cable 1050 for electrical connection to the polarized battery clamp 1070.

The polarized battery clamp 1070 includes a contact handle 1076 with positive battery terminal contact pad 1072 for placement against the positive battery terminal 1062, and a contact arm 1078 with a negative battery terminal contact pad 1074 for placement against the negative battery terminal 1064. One end of the contact handle 1076 has a battery clamp electrical receptacle 1080 containing a positive electrical slot 1082 (hidden) and a negative electrical slot 1084 (hidden). The positive electrical slot 1082 is electrically connected to the positive battery terminal contact pad 1072, and the negative electrical slot 1084 is electrically connected to the negative battery terminal contact pad 1074. A polarity indicator 1086 illuminates to inform a user whether the polarized battery clamp 1070 has been correctly placed onto the battery terminals 1062, 1064. The electrical slots 1082, 1084 are sized and shaped so as to accommodate insertion of the respective electrical prongs 933, 935. To complete a charging setup, the positive electrical prong 1056 is inserted into a positive contact slot 1046 and the negative electrical prong 1058 is inserted into a negative contact slot 1048. In this charging setup, the driver of the vehicle with the source battery 1040 may provide the source battery connection adapter cable 1050, and the polarized battery clamp 1070 may be provided by either driver.

Figure 62:
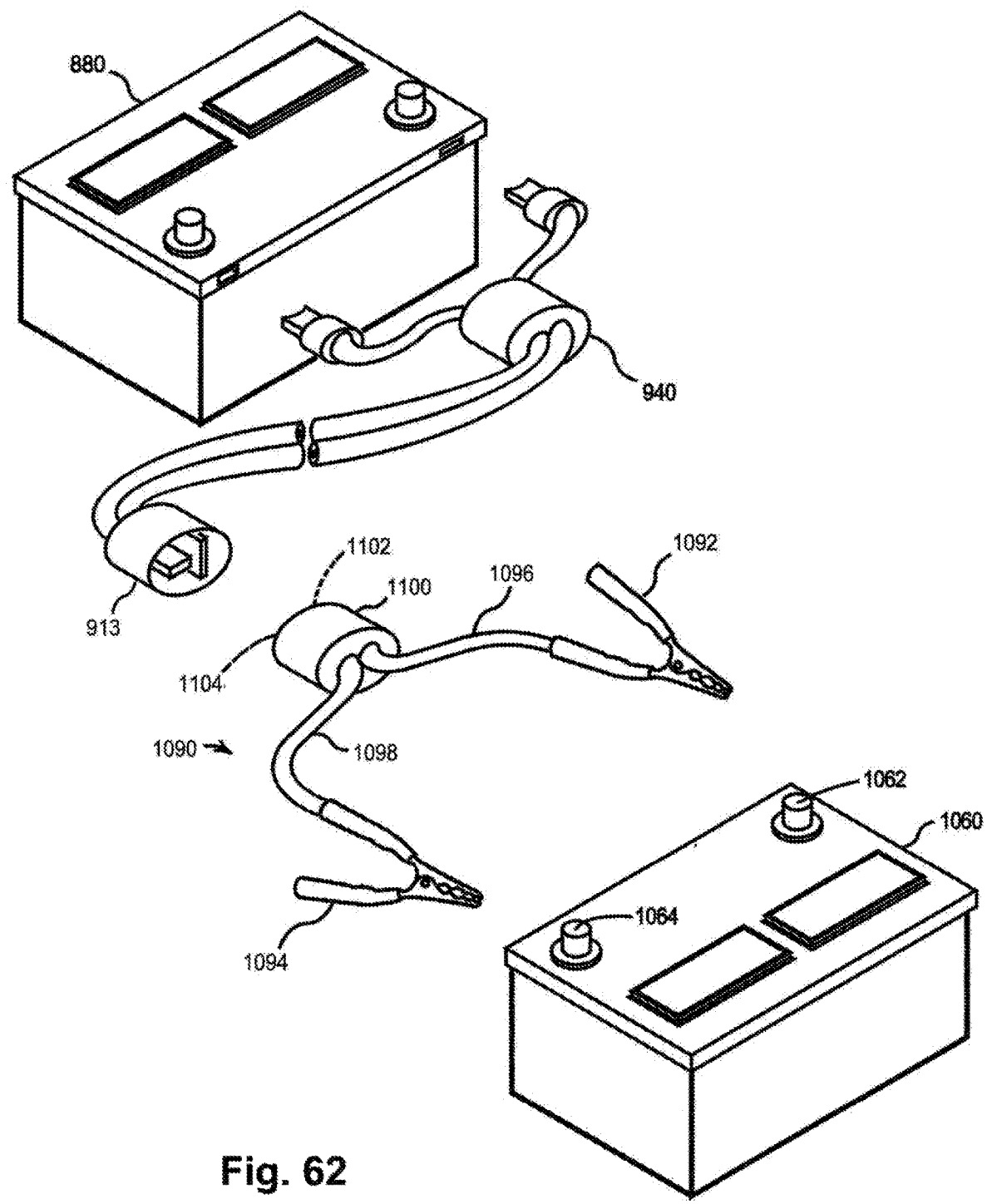
FIG. 62 is an alternative diagrammatical illustration of setup for charging a battery, in which the drained battery has no contact slots, showing a battery connection adapter with a booster cable clamp adapter, in accordance with the present invention.

FIG. 62 illustrates an exemplary alternative application of the present invention in the process of charging the drained battery 1060. In this charging configuration, the source battery 880 is electrically connected to the drained battery 1060 with the battery adapter cable 940 and a booster cable clamp adapter 1090 used at the drained battery 1060. The booster cable clamp adapter 1090 includes a drained polarized receptacle 1100 that includes a positive electrical contact socket 1102 (hidden) and a negative electrical contact socket 1104 (hidden) for electrically mating to the battery adapter cable 940. A positive booster cable clamp 1092 is connected to the positive electrical contact socket 1102 by a positive insulated conductor 1096, and is used for attachment to the positive battery terminal 1062. A negative booster cable clamp 1094 is connected to the negative electrical contact socket 1104 by a negative insulated conductor 1098, and is used for attachment to the negative battery terminal 1064. In this charging setup, the driver of the vehicle with the source battery 880 may provide the battery adapter cable 940, and the booster cable clamp adapter 1090 may be provided by either driver.

It is to be understood that the description herein is only exemplary of the invention, and is intended to provide an overview for the understanding of the nature and character of the disclosed battery features and configurations, and of the cable connection and adapter assemblies. The accompanying drawings are included to provide a further understanding of various aspects and embodiments of the devices of the invention which, together with their description and claims, serve to explain the principles and operation of the invention.

What is claimed is:

1. An automotive battery with a positive battery post providing an electrical path between a positive battery terminal and a positive plate strap, and a negative battery post providing an electrical path between a negative battery terminal and a negative plate strap, said battery comprising:

a positive contact slot encasement internal to the battery, said positive contact slot encasement enclosing a positive contact slot and at least a portion of the positive battery post, said positive contact slot having a first opening in a battery housing, said positive contact slot providing access to a positive battery post contact region so as to allow insertion of a positive electrical prong into said first opening whereby a positive prong contact surface is placed into electrical contact with the positive battery post; and, a negative contact slot encasement internal to the battery, said negative contact slot encasement enclosing a negative contact slot and at least a portion of the negative battery post, said negative contact slot having a second opening in said battery housing, said negative contact slot providing access to a negative battery post contact region so as to allow for insertion of a negative electrical prong into said second opening whereby a negative prong contact surface is placed into electrical contact with the negative battery post.

2. The battery of claim 1 wherein said positive battery post contact region comprises a nonplanar rectangle on a surface of the positive battery post, said nonplanar rectangle bounded by a first circumferential arc, a second circumferential arc, a first longitudinal line segment, and a second longitudinal line segment.

3. The battery of claim 1 wherein said first opening comprises an opening in a battery cover.

4. The battery of claim 1 wherein said first opening comprises an opening in a battery casing.

5. The battery of claim 1 wherein said first opening comprises an opening in a recessed surface on an edge of the battery.

6. The battery of claim 1 further comprising a second positive contact slot having a third opening in said battery housing, said second positive contact slot providing access to a second positive battery post contact region so as to allow insertion of a second positive electrical prong into said third opening whereby said second positive electrical prong is placed into electrical contact with the positive battery post.

7. The battery of claim 1 wherein said positive prong contact surface comprises an oblique concave contact edge.

8. An automotive battery with (i) a positive battery terminal on a battery housing connected to a positive battery post inside the battery housing, the positive battery post providing an electrical path between the positive battery terminal and a positive plate strap in the battery housing, and (ii) a negative battery terminal on the battery housing connected to a negative battery post inside the battery housing, the negative battery post providing an electrical path between the negative battery terminal and a negative plate strap in the battery housing, said battery comprising:

a positive contact slot encasement inside the battery housing, said positive contact slot encasement having a positive cavity side wall attached to the battery housing, a positive cavity end wall attached to the battery housing, and a positive cavity base attached to both said positive cavity walls, said positive contact slot encasement enclosing at least a portion of the positive battery post;

a positive contact slot having an opening in the battery housing to provide for insertion of a positive electrical prong into said positive contact slot encasement, said positive electrical prong having a contact surface for electrically contacting a positive post electrical contact region on a positive battery post surface when inserted into said positive contact slot encasement;

a negative contact slot encasement inside the battery housing, said negative contact slot encasement having a negative cavity side wall attached to the battery housing, a negative cavity end wall attached to the battery housing, and a negative cavity base attached to both said negative cavity walls, said negative contact slot encasement enclosing at least a portion of the negative battery post; and a negative contact slot having an opening in the battery housing to provide for insertion of a negative electrical prong into said negative contact slot encasement, said negative electrical prong having a contact surface for electrically contacting a negative post electrical contact region on a negative battery post surface when inserted into said negative contact slot encasement.

9. The battery of claim 8 wherein said positive battery post contact region comprises a curved band on said positive battery post surface, said curved band bounded by a first circumferential arc, a second circumferential arc, a first longitudinal line segment, and a second longitudinal line segment.

10. The battery of claim 8 wherein said positive cavity base comprises an encasement groove to provide guidance for said positive electrical prong.

11. The battery of claim 8 wherein said positive cavity base comprises a battery post through hole configured to enclose the positive battery post.

12. The battery of claim 8 wherein said positive contact slot comprises a curved encasement channel terminus functioning to force said positive electrical prong against said positive post electrical contact region.

13. The battery of claim 8 wherein said positive cavity end wall comprises a convex surface functioning to force said positive electrical prong against the positive battery post.

14. The battery of claim 8 wherein a longitudinal axis of said positive contact slot forms an acute angle with a longitudinal axis of the positive battery post.

15. A charging system suitable for charging a drained battery using a source battery, said charging system comprising:

a source battery connection adapter having a positive source electrical plug for electrically connecting to a source positive battery post via a source positive contact slot, and a negative source electrical plug for electrically connecting to a source negative battery post via a source negative contact slot;

a drained battery connection adapter having a positive insulated electrical conductor for electrically connecting to a drained positive battery terminal, and a negative insulated electrical conductor for electrically connecting to a drained negative battery terminal; and, an adapter connection cable configured to be electrically connected both to said source battery connection adapter and to said drained battery connection adapter so as to form a battery interconnection cable assembly such that, when said battery interconnection cable assembly is electrically connected both to the source battery and to the drained battery, said battery interconnection cable assembly provides a positive electrical path between said source positive battery post and said drained positive battery terminal, and provides a negative electrical path between said source negative battery post and said drained negative battery terminal.

16. The charging system of claim 15 wherein said source battery connection adapter comprises a positive electrical socket connected to said positive source electrical plug by a positive insulated conductor, and a negative electrical socket connected to said negative source electrical plug by a negative insulated conductor.

17. The charging system of claim 15 wherein said drained battery connection adapter comprises a polarized battery clamp.

18. The charging system of claim 15 wherein said drained battery connection adapter comprises a booster cable clamp adapter.

19. The charging system of claim 15 wherein said adapter connection cable comprises a first polarized electrical plug at a first end of a cable conductor pair and a second polarized electrical plug at a second end of said cable conductor pair.

20. The charging system of claim 15 further comprising a battery side mount clamp attached to the source battery, said battery side mount clamp housing said source positive contact slot for connecting to said positive source electrical plug, and for housing said source negative contact slot for connecting to said negative source electrical plug.

* * * * *